(12) United States Patent
Choi et al.

(10) Patent No.: US 7,580,195 B2
(45) Date of Patent: Aug. 25, 2009

(54) OPTICAL LENS AND METHOD OF MANUFACTURING THE SAME

(75) Inventors: Seung Tae Choi, Yongin-si (KR); Seung Wan Lee, Yongin-si (KR); Woon Bae Kim, Yongin-si (KR); Min Seog Choi, Yongin-si (KR); Eun Sung Lee, Yongin-si (KR); Kyu Dong Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 92 days.

(21) Appl. No.: 11/723,875

(22) Filed: Mar. 22, 2007

(65) Prior Publication Data

US 2008/0112059 A1   May 15, 2008

(51) Int. Cl.
   *G02B 1/06* (2006.01)
(52) U.S. Cl. ...................................... 359/665
(58) Field of Classification Search .......... 359/665–667
   See application file for complete search history.

(56) References Cited

U.S. PATENT DOCUMENTS 5,917,657 A   6/1999   Kaneko et al.

2007/0279758 A1 *  12/2007  Jiang et al. .................. 359/666

FOREIGN PATENT DOCUMENTS

| JP | 07-049404 A | 2/1995 |
| JP | 7-49404 A | 2/1995 |
| JP | 8-114703 A | 5/1996 |
| JP | 10-144975 A | 5/1998 |
| JP | 10-269599 A | 10/1998 |
| JP | 2003-114309 A | 4/2003 |
| KR | 10-2001-0068217 A | 7/2001 |
| KR | 10-2004-0042381 A | 5/2004 |
| KR | 10-2005-0085915 A | 8/2005 |
| KR | 10-2006-0017055 A | 2/2006 |
| KR | 10-2006-0028493 A | 3/2006 |
| WO | 02/14926 A2 | 2/2002 |

* cited by examiner

*Primary Examiner*—Darryl J Collins
(74) *Attorney, Agent, or Firm*—Sughrue Mion, PLLC

(57) ABSTRACT

An optical lens is provided. The optical lens provides miniaturization and thin size, and reduces the cost and improves productivity by simplifying the structure and manufacturing process. The optical lens includes a light-transmitting substrate with a lens chamber and a fluidic chamber that are connected with each other. The optical lens also includes a light-transmitting elastic film which seals the lens chamber, a buffer elastic film which seals the fluidic chamber, and an actuator on the buffer elastic film which corresponds to the fluidic chamber, and varies the volume of the fluidic chamber to vary a pressure acting on the light-transmitting elastic film.

58 Claims, 18 Drawing Sheets

130a

130b

OPTICAL LENS AND METHOD OF MANUFACTURING THE SAME

CROSS-REFERENCE TO RELATED APPLICATIONS

This application claims priority from Korean Patent Application No. 10-2006-0111723, filed on Nov. 13, 2006 in the Korean Intellectual Property Office, the disclosure of which is incorporated herein by reference.

BACKGROUND OF THE INVENTION

1. Field of the Invention

Apparatuses and manufacturing methods consistent with the present invention relate to an optical lens, and more particularly, to a variable focus optical lens that provides miniaturization and thin size, and reduces the cost and improves productivity by simplifying the structure and manufacturing process.

2. Description of the Related Art

In general, an optical lens is a transparent body or lens having at least two refractive curves. The optical lens is widely used in various applications, such as cameras, telescopes, and microscopes.

For example, a camera module using an optical lens is used for a personal mobile terminal, such as a cellular phone or a personal digital assistant (PDA), as well as a camera set. Recently, the personal mobile terminal has been developed as a multipurpose electronic device having various multimedia functions, such as a camera, a game, a music player, broadcasting, and connecting with the Internet, in addition to a simple audio transceiver function. Also, attempts to integrate more functions in a small area have been made for the personal mobile terminal.

Furthermore, the camera module has recently developed auto focusing, auto zooming, and an auto macro function to obtain better images. However, when a camera module for a personal mobile terminal is manufactured to have these various advanced functions, the camera module is limited in its size, due to the size of a lens and a mechanical lens driving gear.

In other words, to obtain the advanced functions, unlike a basic lens, a lens for each type is required, such as a proximity lens, a standard lens, a telephoto lens, and a zoom lens, and the lens should be exchanged with another lens, depending on the intended use. To achieve auto focusing, the focal distance of the lens should be varied. Since a separate motor or driver is required to control such variations, a problem occurs in that the whole size of the camera module increases.

To solve such a problem, a liquid lens (or fluid lens) based on electrowetting has been suggested. The liquid lens achieves auto focusing and auto zooming by using its curvature variation. According to the electrowetting technology, a voltage is externally applied to an electrode coated with an insulator and a conductive fluid to eliminate surface tension of the conductive fluid when the conductive fluid and a non-conductive fluid are in contact with each other on the electrode, whereby a contact angle of the conductive fluid and a shape of a boundary between the two fluids are varied. The liquid lens based on electrowetting has an advantage in that a small sized camera module can be obtained as no mechanical lens motion is needed.

However, the related art liquid lens has several problems. As the liquid lens is manufactured for each chip by separate process steps, the number of manufacturing process steps increase, thus the manufacturing cost increases and productivity is reduced. Also, a problem occurs in that a high driving voltage is required to create the flow of fluid and to apply a hydraulic pressure to the fluid. Furthermore, a problem occurs in that the response time required for focusing increases.

Moreover, when the hydraulic pressure (or flow) is applied to the fluid, a problem occurs in that it is difficult to dispense the exact amount of the fluid. In particular, local strain unstably occurs in a boundary portion between a lens portion and a channel and thus the exact amount of the fluid is not dispensed. This deteriorates reliability and stability.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an optical lens and a method of manufacturing the same, in which the optical lens can be manufactured with miniaturization and thin size, and its structure and manufacturing process steps are simplified to reduce the cost and improve productivity.

An aspect of the present invention also provides an optical lens and a method of manufacturing the same, in which the optical lens can be manufactured in a wafer-level process to facilitate mass production and reduce the manufacturing cost.

An aspect of the present invention also provides an optical lens and a method of manufacturing the same, in which low power consumption is required to obtain optimized efficiency when a flow occurs in a fluid or a hydraulic pressure is applied to a fluid.

An aspect of the present invention also provides an optical lens and a method of manufacturing the same, in which the response time required for focusing can be reduced.

An aspect of the present invention also provides an optical lens and a method of manufacturing the same, in which a fluid can uniformly be dispensed when a hydraulic pressure (or flow) is applied to the fluid, whereby reliability and stability can be prevented from being decreased.

According to an aspect of the present invention, there is provided an optical lens comprising a light-transmitting substrate which comprises a lens chamber and a fluidic chamber, wherein the lens chamber and the fluidic chamber are connected with each other; a light-transmitting elastic film which seals the lens chamber; a buffer elastic film which seals the fluidic chamber; and an actuator on the buffer elastic film which corresponds to the fluidic chamber, and varies a volume of the fluidic chamber to vary a pressure acting on the light-transmitting elastic film.

The light-transmitting elastic film and the buffer elastic film may be connected with each other to form a single body. Alternatively, the light-transmitting elastic film and the buffer elastic film may be detached from each other. The light-transmitting elastic film and the buffer elastic film may be formed of the same material or different materials.

According to another aspect of the present invention, there is provided an optical lens comprising a light-transmitting substrate which comprises a lower lens surface and a fluidic chamber, wherein the lower lens surface and the fluidic chamber are spaced apart from each other and are connected with each other; a light-transmitting elastic film on the light-transmitting substrate which seals the lower lens surface and the fluidic chamber, and forms a variable upper lens surface above the lower lens surface; and an actuator on the light-transmitting elastic film which corresponds to the fluidic chamber and is strained if a power source is applied thereto, which varies a volume of the fluidic chamber.

The light-transmitting substrate may be formed of various sizes and materials, and may be made from a circular wafer. A channel may be formed entirely between the fluidic chamber and the lower lens surface. Alternatively, a plurality of channels may be formed at predetermined intervals. A single fluidic chamber may be formed only for the lower lens surface. Conversely, a plurality of fluidic chambers may be formed for the lower lens surface, wherein the fluidic chambers are connected with one another. Also, the light-transmitting substrate further includes an optical lens surface arranged on a channel of light that passes through the lower lens surface. The optical lens surface may have a spherical or a non-spherical structure.

The light-transmitting elastic film may be formed of a material having the same properties as that of the light-transmitting substrate, or a material having different properties as that of the light-transmitting substrate (for example, refractive index and transmissivity). The efficiency of the actuator which is curve-strained depends on the binding conditions of the actuator. Accordingly, the light-transmitting elastic film is preferably formed of a material having an elastic modulus lower than that of the actuator, to minimize binding of the actuator and maximize efficiency of the actuator. For example, the light-transmitting elastic film may be formed of polydimethylsiloxane (PDMS), which is transparent and has excellent durability and flexibility. In addition, the light-transmitting elastic film may be formed of elastomer. Either a functional coating layer, such as an antireflective coating layer and an anti-infrared coating layer, or a protective layer, may be formed on the surface of the light-transmitting elastic film.

The lower lens surface and the upper lens surface of the light-transmitting substrate and the light-transmitting elastic film may have a convex or concave spherical structure. Alternatively, the lower lens surface and the upper lens surface may have a non-spherical structure.

Various related art actuators may be used as the actuator. Preferably, a polymer actuator formed of an electro active polymer (EAP), which is very thin and has low power consumption, may be used as the actuator. Examples of the polymer actuator include an electrostrictive polymer such as P(VDF-TrFE) (interpolymer), a dielectric elastomer such as acrylate or silicon, and an ionic polymer such as ionic polymer metal composite (IPMC).

According to another aspect of the present invention, there is provided an optical lens comprising a light-transmitting substrate which comprises a lower lens surface and a fluidic chamber, wherein the lower lens surface and the fluidic chamber are spaced apart from each other; a cover substrate with a lens hole which is formed to correspond to the lower lens surface and which is provided on the light-transmitting substrate to cover an upper portion of the fluidic chamber; a light-transmitting elastic film on the cover substrate which seals the lens hole and forms an upper lens surface above the lower lens surface; and an actuator on a bottom of the light-transmitting substrate which covers a lower portion of the fluidic chamber, and which is strained if a power source is applied thereto, which varies a volume of the fluidic chamber, wherein a channel is formed of at least one of opposing surfaces of the light-transmitting substrate and the cover substrate, and the channel connects the lower lens surface with the fluidic chamber.

The light-transmitting substrate may be formed of various sizes and materials, and may be made from a circular wafer. The cover substrate may be formed of the same material as that of the light-transmitting substrate, or may be formed of a material having different properties (for example, refractive index and transmissivity) from that of the light-transmitting substrate. Since the cover substrate is not a portion through which light is directly transmitted, unlike the light-transmitting substrate, the cover substrate may be formed of a material having poor light-transmitting performance.

Bonding between the cover substrate and the light-transmitting substrate may be performed by a typical bonding method. For example, the cover substrate and the light-transmitting substrate may be bonded to each other by direct bonding or anodic bonding. Alternatively, the cover substrate and the light-transmitting substrate may be bonded to each other by a typical adhesive.

Furthermore, a channel may be formed only on the light-transmitting substrate or the cover substrate. Conversely, channels may respectively be formed at opposing surfaces of the light-transmitting substrate and the cover substrate to cooperate with each other.

A buffer elastic film may be provided on a bottom of the light-transmitting substrate, and the actuator may be provided on the buffer elastic film. The buffer elastic film may be formed of the same or a different material from the light-transmitting elastic film. Since the buffer elastic film is not a portion through which light is directly transmitted, unlike the light-transmitting elastic film, the buffer elastic film may be formed of a material having poor light-transmitting performance. Preferably, the buffer elastic film may be formed of a material having an elastic modulus equivalent to that of the light-transmitting elastic film to improve the efficiency of the actuator.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF EXEMPLARY EMBODIMENTS OF THE INVENTION

Figure 1:
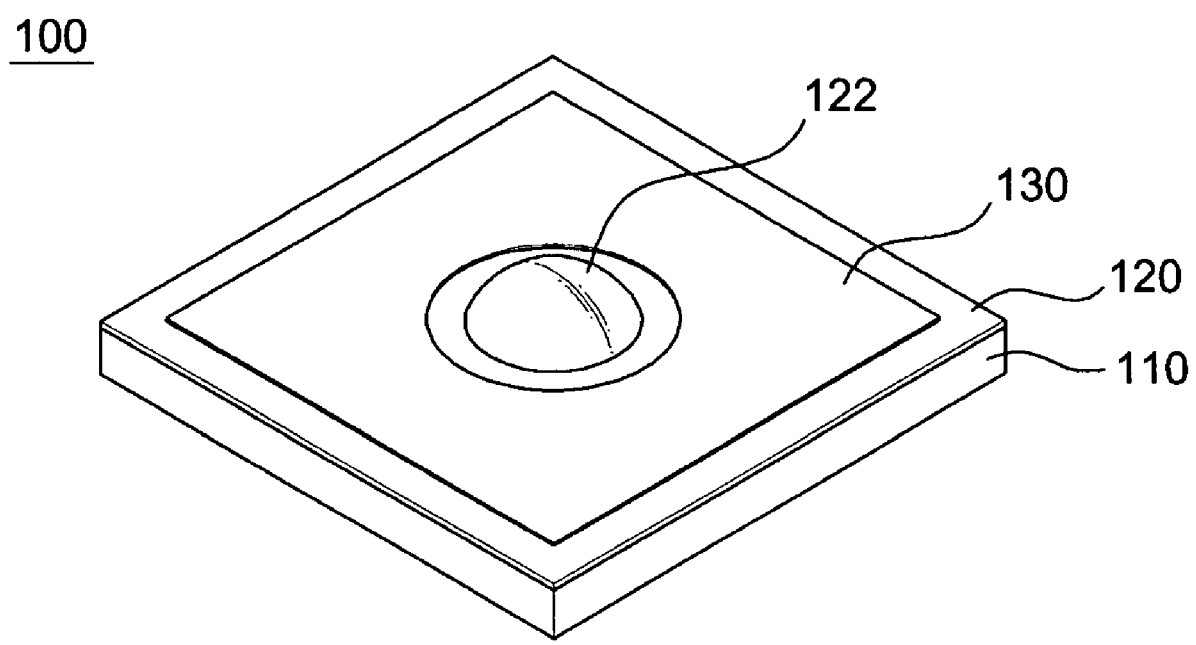
FIG. 1 is a perspective view illustrating a structure of an optical lens according to an exemplary embodiment of the present invention.

Reference will now be made in detail to the exemplary embodiments of the present invention, examples of which are illustrated in the accompanying drawings, wherein reference numerals of elements are used consistently throughout this specification. The exemplary embodiments are described below to explain the present invention by referring to the figures. The detailed description of the known function or constitution may be omitted to clarify the subject matter of the present invention.

Figure 2:
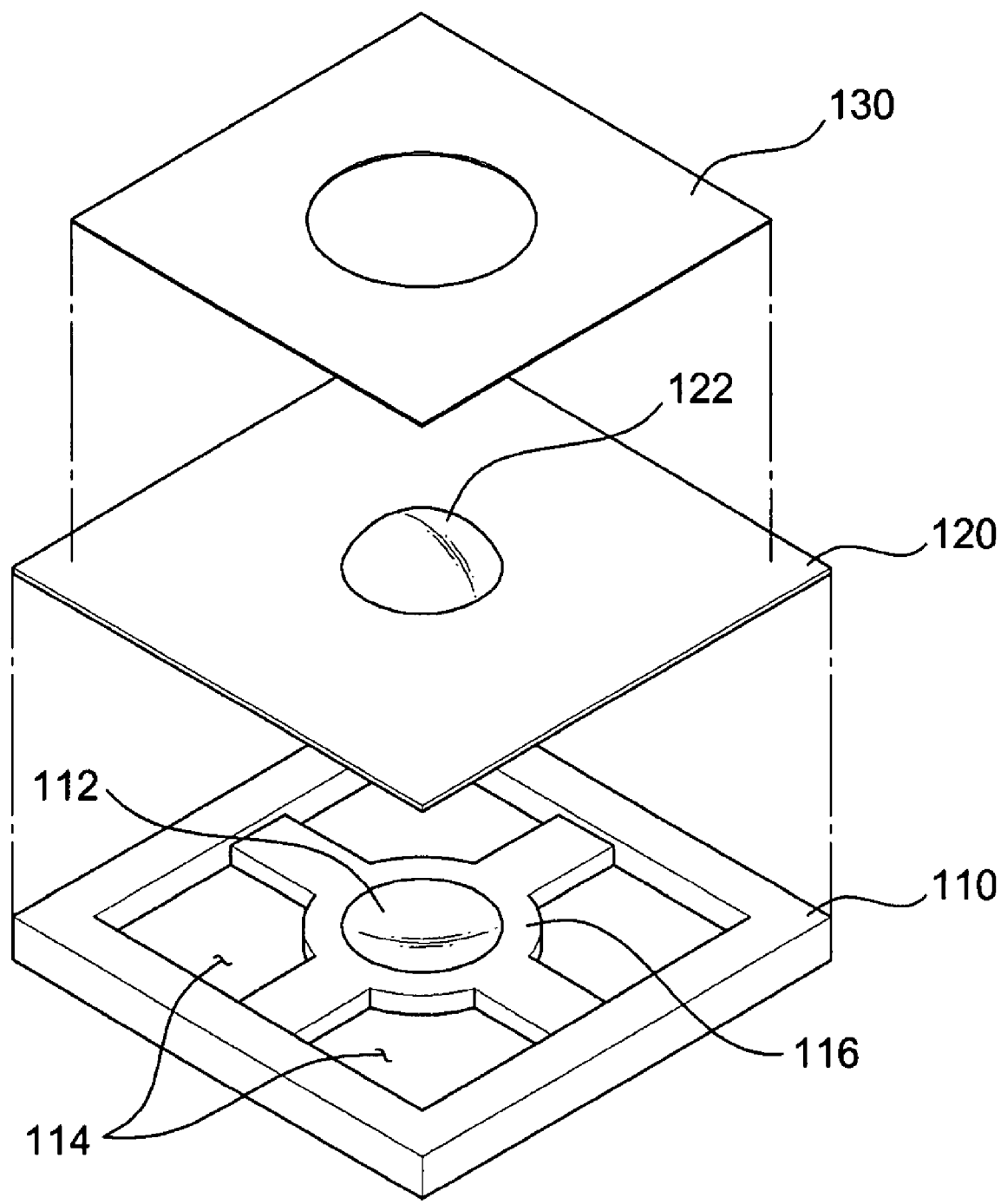
FIGS. 2 and 3 are an exploded perspective view and a partially cut perspective view, respectively, illustrating a structure of an optical lens according to an exemplary embodiment of the present invention.
Figure 3:
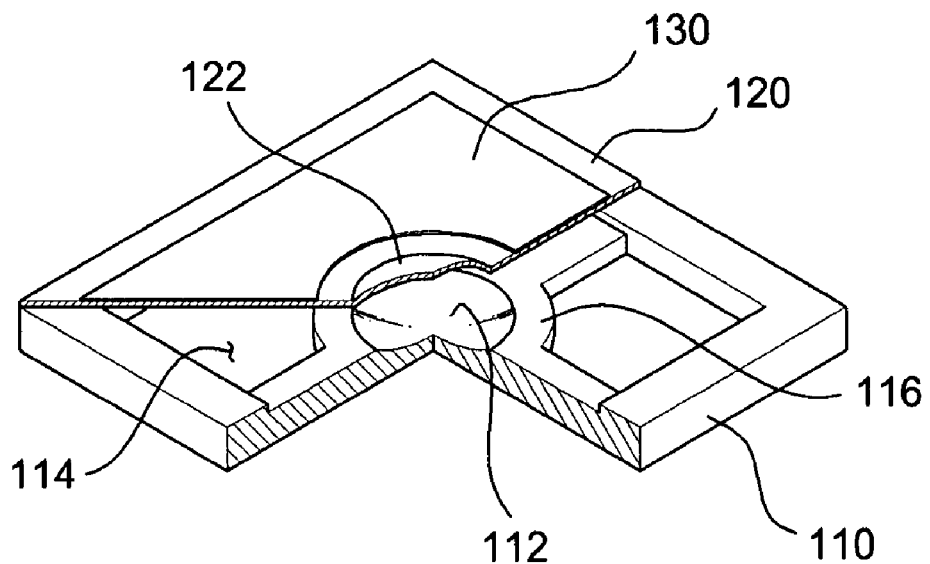
Figure 4:
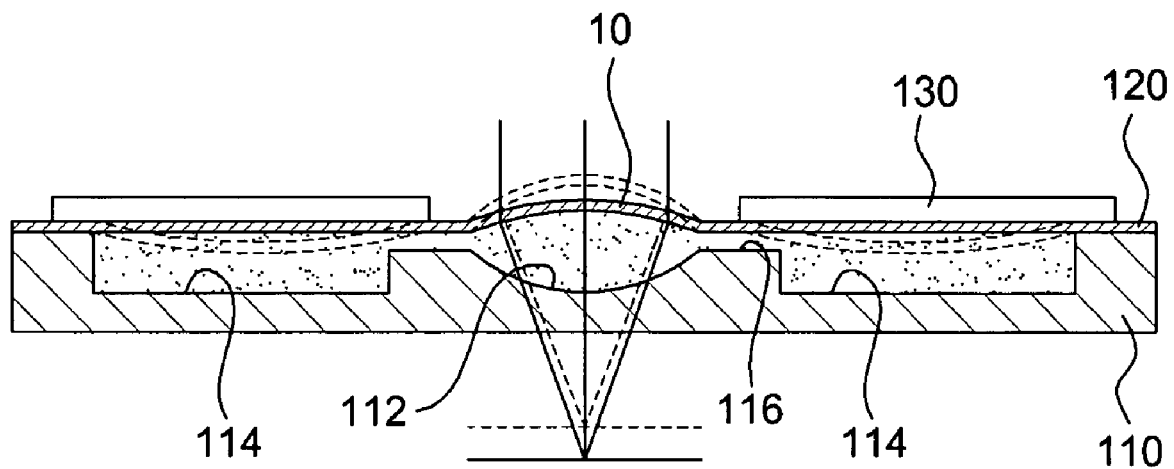
FIG. 4 is a sectional view illustrating a structure of an optical lens according to an exemplary embodiment of the present invention.

FIG. 1 is a perspective view illustrating a structure of an optical lens according to an exemplary embodiment of the present invention. FIGS. 2 and 3 are an exploded perspective view and a partially cut perspective view, respectively, illustrating a structure of an optical lens according to an exemplary embodiment of the present invention. FIG. 4 is a sectional view illustrating a structure of an optical lens according to an exemplary embodiment of the present invention.

An optical lens according to the present invention includes a light-transmitting substrate provided with a lens chamber and a fluidic chamber, wherein the lens chamber and the fluidic chamber are connected with each other, a light-transmitting elastic film sealing the lens chamber, a buffer elastic film sealing the fluidic chamber, and an actuator provided on the buffer elastic film to correspond to the fluidic chamber, varying the volume of the fluidic chamber to vary a pressure acting on the light-transmitting elastic film. The light-transmitting elastic film and the buffer elastic film may be connected with each other to form a single body, or may be provided independently from each other. Also, the light-transmitting elastic film and the buffer elastic film may be formed of the same material or different materials. Hereinafter, an example of the light-transmitting elastic film and the buffer elastic film, which are formed in a single body, will be described.

As shown in FIG. 1 to FIG. 4, an optical lens 100 according an exemplary embodiment of the present invention includes a light-transmitting substrate 110, a light-transmitting elastic film 120, and an actuator 130.

The light-transmitting substrate 10 is formed of a transparent or semi-transparent light-transmitting material. For example, the light-transmitting substrate 110 may be formed of a transparent glass or silicon. The light-transmitting substrate 110 may be made from a circular wafer of a light-transmitting material, wherein the circular wafer has various sizes such as 4 inches, 6 inches, 8 inches, and 10 inches.

A fluidic chamber 114 having a predetermined depth and a lower lens surface 112 are formed to be exposed on the light-transmitting substrate 110, wherein the lower lens surface 112 is spaced apart from the fluidic chamber 114 at a predetermined distance. The fluidic chamber 114 and the lower lens surface 112 are connected with each other. Specifically, a channel 116 is formed between the fluidic chamber 114 and the lower lens surface 112. The channel 116 is also exposed to the top surface of the light-transmitting substrate 110. The fluidic chamber 114, the lower lens surface 112, and the channel 116 can be formed by etching or a mechanical process. The channel 116 may be formed entirely between the fluidic chamber 114 and the lower lens surface 112. Alternatively, a plurality of channels 116 may be formed at predetermined intervals. The channel may be formed inside the light-transmitting substrate.

Furthermore, a single fluidic chamber 114 may be formed only for the lower lens surface 112. Conversely, a plurality of fluidic chambers may be formed for the lower lens surface 112, wherein the fluidic chambers are connected with one another. The number and arrangement structure of the fluidic chambers 114 may depend on required conditions and design options.

The light-transmitting elastic film 120 is formed of a transparent or semi-transparent elastic material, and is provided on the light-transmitting substrate 110 to seal the lower lens surface 112 and the fluidic chamber 114. An upper lens surface 122 is formed above the lower lens surface 112.

The light-transmitting elastic film 120 may be formed of a material having the same properties as that of the light-transmitting substrate 110, or different properties from that of the light-transmitting substrate 110 (for example, refractive index and transmissivity). For example, the light-transmitting elastic film 120 may be formed of PDMS, which is transparent and has excellent durability and flexibility. In addition, the light-transmitting elastic film 120 may be formed of elastomer.

The light-transmitting elastic film 120 is bonded to the top surface of the light-transmitting substrate 110 in a single body by a typical adhesive or a bonding method, whereby the lower lens surface 112, the fluidic chamber 114, and the channel 116 are sealed, and a part of the light-transmitting elastic film 120 forms the upper lens surface 122 above the lower lens surface 112. Either a functional coating layer, such as an antireflective coating layer and an anti-infrared coating layer, or a protective layer may be formed on the surface of the light-transmitting elastic film 120.

The lower lens surface 112 and the upper lens surface 122 may have a convex or concave spherical structure. Alternatively, the lower lens surface 112 and the upper lens surface 122 may have a non-spherical structure.

Also, an optical fluid 10 such as water or oil may be injected into a sealing space sealed by the light-transmitting elastic film 120. Specifically, an injection hole for injecting the optical fluid 10 may be formed at one side of the light-transmitting substrate 110. After the optical fluid 10 is injected into the injection hole, the injection hole is again sealed.

The actuator 130 is provided on the light-transmitting elastic film 120 to correspond to the fluidic chamber 114, so that the pressure selectively acting on the upper lens surface 122 may be varied. As a power source is applied, the actuator 130 is strained to be curved up or down, and thus varies the volume of the fluidic chamber 114. Specifically, if the volume of the fluidic chamber 114 is varied by such strain of the actuator 130, the volume of the lens chamber, defined as the space between the upper lens surface 122 and the lower lens surface 112, and connected with the fluidic chamber 114, is also varied. As a result, the pressure acting on the upper lens surface 122 is varied and strain is caused, whereby a focal distance by the upper lens surface 122 and the lower lens surface 112 may be varied.

Various related art actuators may be used as the actuator 130. Preferably, but not necessarily, a polymer actuator made of an EAP, which is very thin and has low power consumption, may be used as the actuator 130.

The EAP is a material that becomes strained when a voltage is applied thereto, similar to piezoelectric material. The EAP differs from the piezoelectric material in that strain size of the EAP is considerably greater than that of the piezoelectric material. The EAP can be categorized into an EAP actuated by an electric field, an EAP actuated by static electricity, and an EAP actuated by ions.

Figure 5:
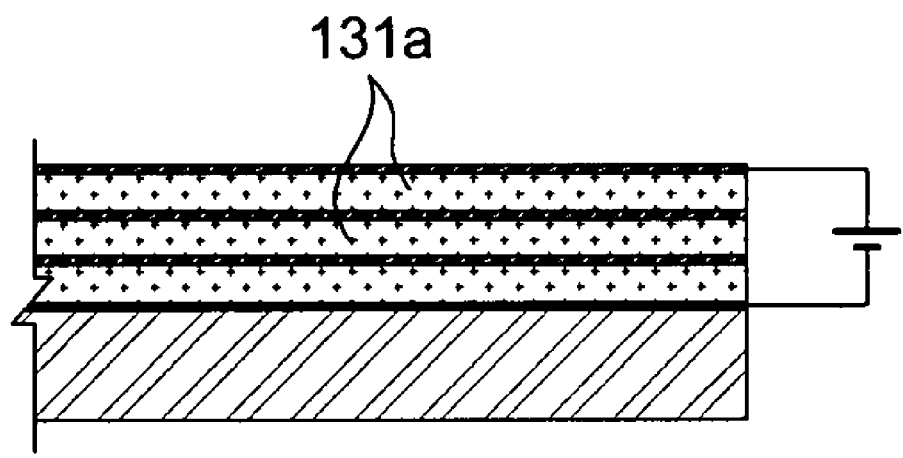
FIG. 5 to FIG. 7 illustrate a polymer actuator of an optical lens according to an exemplary embodiment of the present invention.
Figure 6:
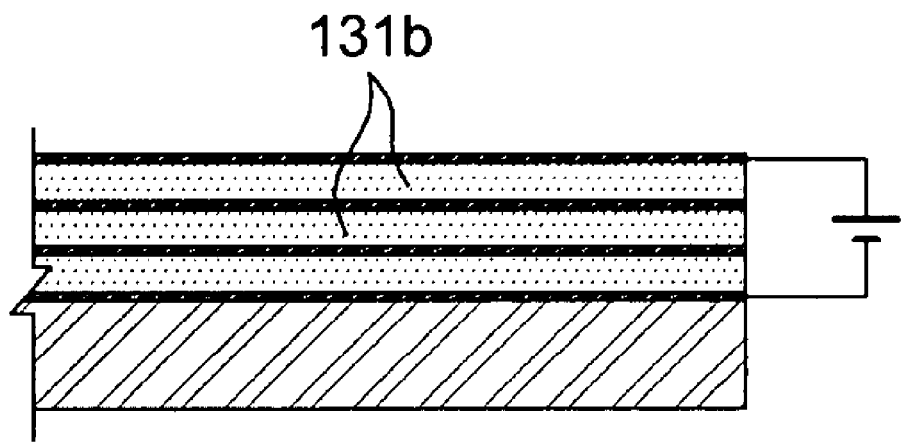
Figure 7:
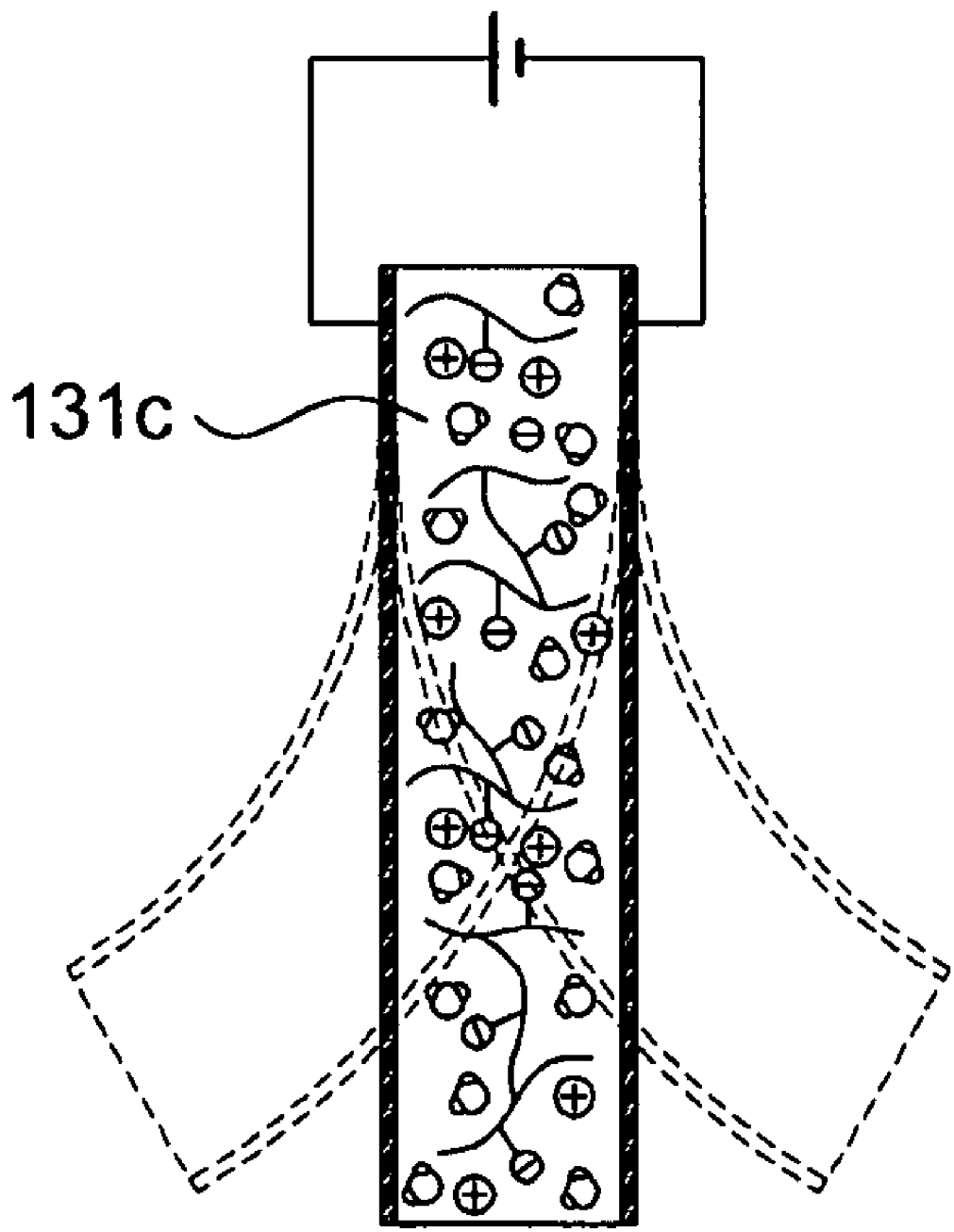

Also, FIG. 5 to FIG. 7 illustrate a polymer actuator in an optical lens according to an exemplary embodiment of the present invention.

As shown in FIG. 5, a polymer actuator 130a includes an electrostrictive polymer such as P(VDF-TrFE) (interpolymer). When the power source is applied to an electrostrictive polymer layer 131a, electrostrictive strain similar to a piezoelectric effect is caused, whereby the polymer actuator 130a is strained to be curved up or down.

As another example, as shown in FIG. 6, the polymer actuator 130b may include a dielectric elastomer, such as acrylate or silicon. The power source is applied to electrodes provided at both sides of a dielectric elastomer layer 131b so that a potential difference may be applied to both electrodes, whereby the dielectric elastomer layer 131b may be strained to be curved up or down by a Maxwell force between the dielectric elastomer layer 131b and each electrode.

As another example, as shown in FIG. 7, the polymer actuator 130c may include an ionic polymer such as IPMC. When the power source is applied to electrodes provided at both sides of an ion polymer layer 131c, the ion polymer layer 131c may be strained to be curved up or down by electroosmosis, in which a positive ion inside the ion polymer layer 131c moves to a cathode.

Figure 8A:
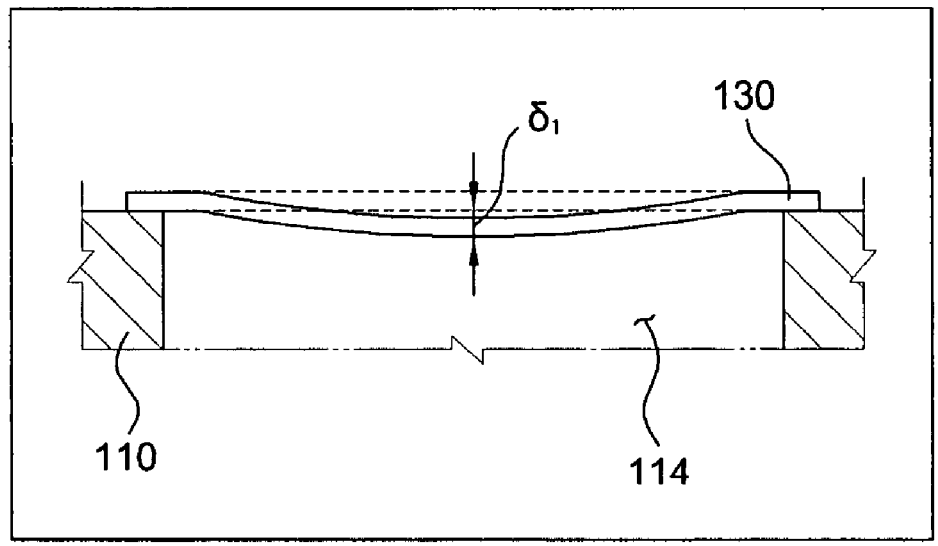
FIGS. 8A and 8B are sectional views illustrating the operation state of an actuator and a light-transmitting elastic film in an optical lens according to an exemplary embodiment of the present invention.
Figure 8B:
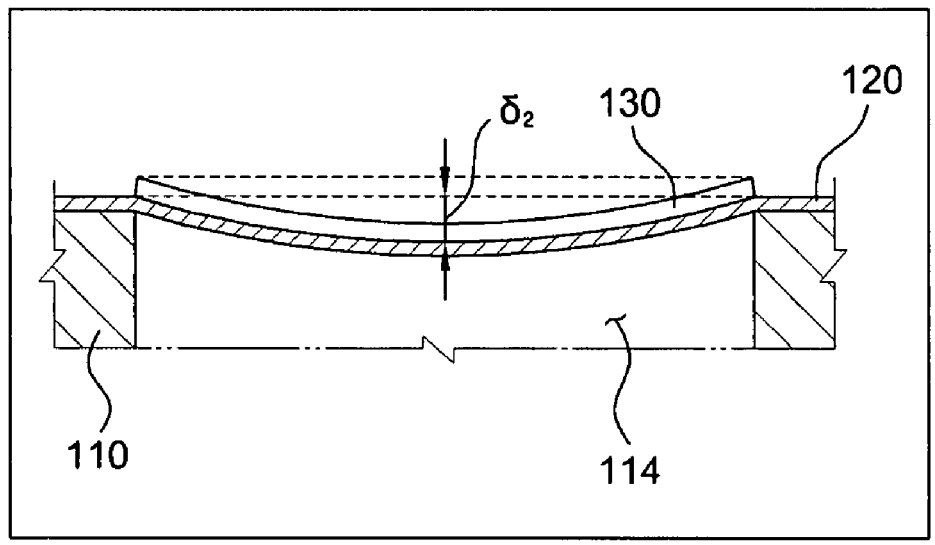

Moreover, as the actuator 130 is bonded onto the light-transmitting elastic film 120, the efficiency of the actuator can be maximized. FIGS. 8A and 8B illustrate the operation state of the actuator in the optical lens according to an exemplary embodiment of the present invention. As shown in FIGS. 8A and 8B, since the light-transmitting elastic film 120 formed of an elastic polymer such as PDMS has an elastic modulus lower than that of the polymer actuator 130 formed of an active polymer in the range of one several hundredth, the light-transmitting elastic film 120 does not bind the polymer actuator 130 when the polymer actuator 130 is curved, whereby the efficiency of the polymer actuator 130 can be maximized.

Specifically, as shown in FIG. 8A, if the actuator 130 is directly mounted on the light-transmitting substrate 110 without passing through the light-transmitting elastic film 120, a bonded portion of the actuator 130 is bound in the light-transmitting substrate 110, whereby a strain 61 of the actuator 130 does not occur efficiently. However, as shown in FIG. 8B, if the actuator 130 is mounted on the light-transmitting substrate 110 through the light-transmitting elastic film 120, a bonded portion of the actuator 130 is also strained when the actuator 130 is curve-strained, and the light-transmitting elastic film 120 does not bind the bonded portion of the actuator 130, whereby a strain 62 of the actuator 130 can be maximized. As a result, the power consumption can be minimized, and the strain and response speed of the actuator 130 can be maximized under the same power.

Figure 9:
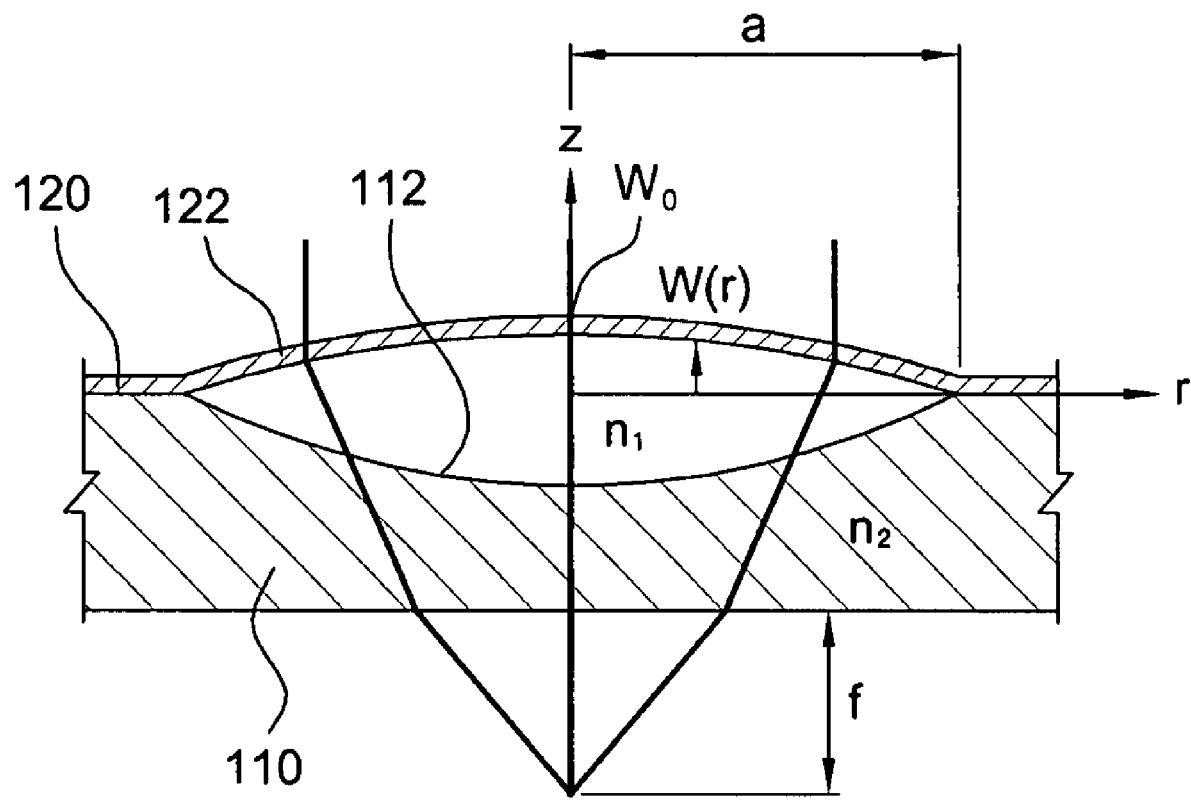
FIGS. 9 and 10 illustrate a design condition of a lens portion and an actuator in an optical lens according to an exemplary embodiment of the present invention.
Figure 10:
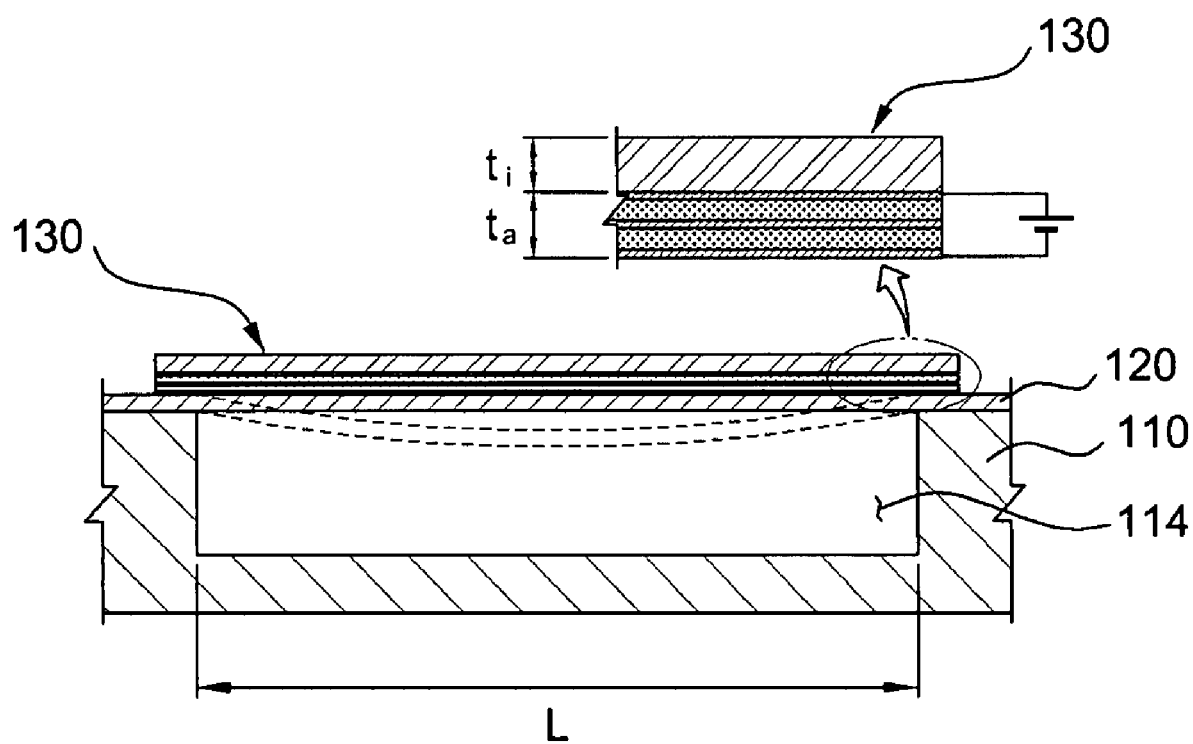

Also, FIGS. 9 and 10 illustrate a design condition of a lens portion and an actuator in an optical lens according to an exemplary embodiment of the present invention.

A shape of the light-transmitting elastic film 120 varied by variation of the hydraulic pressure (or flow) can be approximated based on Equation 1 below.

$$W(r) = W_0\left(1 - \frac{r^2}{a^2}\right)^2 \quad \text{[Equation 1]}$$

Referring to FIG. 9, in Equation 1, W(r) is displacement in a direction 'z', $W_O$ is maximum displacement in the center, and a is a radius of the lens.

When the maximum displacement is given in the center, the volume variation of an optical fluid contained in the lens becomes $\Delta V = (\pi/6)W_0 a^2$. Also, when the strain given by Equation 1 occurs, the focal distance 'f' is obtained by Equation 2 below.

$$\frac{1}{f} = \frac{n_1 - 1}{R_1} - \frac{n_2 - n_1}{R_2} \quad \text{[Equation 2]}$$

Referring to FIG. 9, in Equation 2, $n_1$ and $n_2$ are refractive indices of the optical fluid and the light-transmitting substrate 110, respectively, and $R_1$ and $R_2$ are curvature radiuses of the upper lens surface 122 and the lower lens surface 112, respectively.

Therefore, the first term of the right side of Equation 2 represents a dioptric power that is varied when $R_1$ is varied, and the second term of the right side of Equation 2 represents a dioptric power that is fixed by the lower lens surface 112. Assuming that the optical fluid is oil ($n_1$=1.52) and the light-transmitting substrate 110 is glass ($n_2$=1.60), in order to give variation of 50 D. (diopter), a curvature radius of the upper lens surface 122 should be varied in the range of more than 10 mm. This corresponds to a maximum deflection of $W_O$=50 μm (volume variation of oil, 25 nano liter) for the upper lens surface 122, whose diameter is 1 mm.

The light-transmitting elastic film 120 requires certain properties. Specifically, the light-transmitting elastic film 120 should have good transmissivity in the same manner as PDMS, should have a low Young's modulus (several KPa) to generate strain by only the hydraulic pressure in the range of several KPa, and should not cause permanent strain even while incurring a high strain. As calculated by the respective equations as above, to vary dioptric power of 50 D., the light-transmitting elastic film 120 should be driven to generate a deflection of $W_O$=50 μm. In this case, the required hydraulic pressure p can be calculated from Equation 3 below.

$$p = \frac{16Et^3 W_0}{3(1-v^2)a^4}\left[1 + 0.488\left(\frac{w_0}{t}\right)^2\right] \quad \text{[Equation 3]}$$

In Equation 3, E is Young's modulus, v is Poisson's ratio, and t is a thickness. Supposing that the thin film is PDMS (E=about 3 MPa, v=0.48) and the thickness is 0.1 mm, a the hydraulic pressure of about 1 KPa is required to generate a deflection of $W_O$=50 μm.

Also, when the polymer actuator which includes an electrostrictive polymer is used as the actuator 130 and driven, the structure as shown in FIG. 10 is obtained.

As shown in FIG. 10, since the polymer actuator 130 includes an upper inactive area with a thickness ti and a lower active area with a thickness ta, expansion or contraction occurs in a direction vertical to an electrode when a voltage is applied to the polymer actuator 130. Also, strain occurs in a direction parallel with the electrode due to Poisson effect. Thus, curve strain is caused to the whole structure of the actuator 130. For reference, when an effect of the light-transmitting elastic film 120 having low elastic modulus is disregarded, the height of the upper inactive area should be equal to that of the lower active area to obtain maximum strain. The light-transmitting elastic film 120 is efficiently used to increase the strain of the actuator 130. In other words, the efficiency of the actuator 130 which is curve-strained depends on the binding conditions of the actuator 130. Since the elastic modulus of the light-transmitting elastic film 120 is lower than that of the polymer used as the actuator 130 in the range of one several hundredth, the light-transmitting elastic film 120 does not bind the actuator 130 when the actuator 130 is curve-strained, whereby a high efficiency of the actuator 130 is obtained. In order to vary a dioptric power of 50 D. (diopter) calculated through Equation 2 (this corresponds to a driving volume of 25 nano liter), a deflection of about 30 mm is required if the fluidic chamber 114 is 2 mm*2 mm. This means that the actuator 130 with a thickness of 80 mm (ta=40 mm, ti=40 mm) should be designed to generate an electrostrictive strain of about 0.3%.

Hereinafter, a method for manufacturing an optical lens according to an exemplary embodiment of the present invention will be described.

FIG. 11 to FIG. 19 are sectional views illustrating a method for manufacturing an optical lens according to an exemplary embodiment of the present invention.

The optical lens according to the present invention can be manufactured in a wafer-level process which includes providing a light-transmitting substrate 110 with a lower lens surface 112 and a fluidic chamber 114, the lower lens surface 112 and the fluidic chamber 114 being spaced apart from each other and connected with each other; providing a light-transmitting elastic film 120 on the light-transmitting substrate 110 to seal the lower lens surface 112 and the fluidic chamber 114 and form an upper lens surface 122 above the lower lens surface 112; providing an actuator 130 on the light-transmitting elastic film 120 to correspond to the fluidic chamber 114, the actuator 130 being strained if a power source is applied thereto; and dicing the light-transmitting substrate 110 to provide individual modules corresponding to the upper lens surface 122, the lower lens surface 112, and the fluidic chamber 114.

Figure 11:
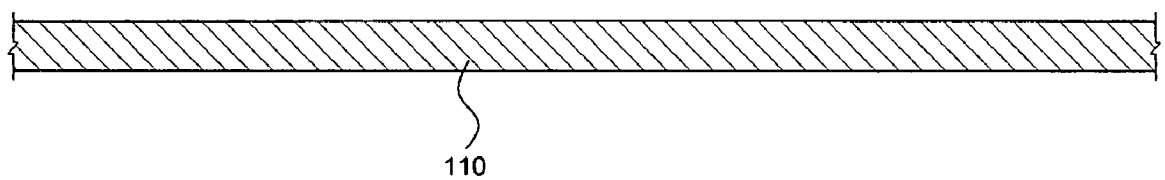
FIG. 11 to FIG. 19 are sectional views illustrating a method for manufacturing an optical lens according to an exemplary embodiment of the present invention.

In the providing the light-transmitting substrate 110, as shown in FIG. 11, the light-transmitting substrate 110 formed of a transparent or semitransparent light-transmitting material is prepared. For example, the light-transmitting substrate 110 is a related art transparent glass, and may have various sizes such as 4 inches, 6 inches, 8 inches, and 10 inches.

Figure 12:
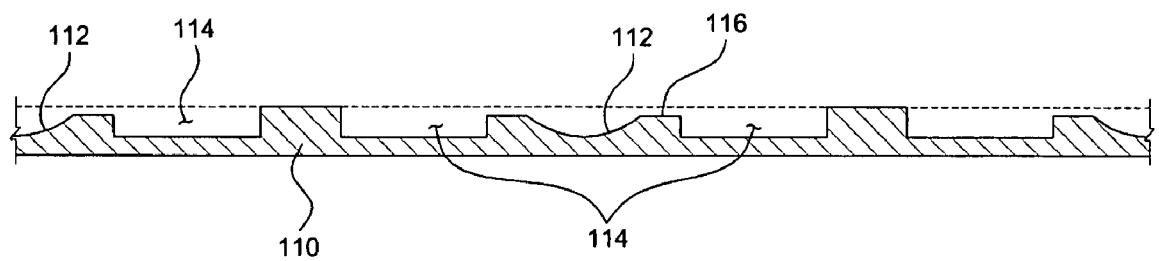

As shown in FIG. 12, the fluidic chamber 114 having a predetermined depth and the lower lens surface 112 are formed to be exposed on the light-transmitting substrate 110, wherein the lower lens surface 112 is spaced apart from the fluidic chamber 114 at a predetermined distance. The fluidic chamber 114 and the lower lens surface 112 are connected with each other. The fluidic chamber 114 and the lower lens surface 112 may be connected with each other by forming a channel 116, which connects the lower lens surface 112 with the fluidic chamber 114, on the light-transmitting substrate 110 to be externally exposed. The fluidic chamber 114, the lower lens surface 112, and the channel 116 may be formed by etching or a mechanical process.

The channel 116 may be formed entirely between the fluidic chamber 114 and the lower lens surface 112. Alternatively, a plurality of channels 116 may be formed at predetermined intervals. Furthermore, a single fluidic chamber 114 may be formed only for the lower lens surface 112. Conversely, a plurality of fluidic chambers may be formed for the lower lens surface 112, wherein the fluidic chambers are connected with one another.

Next, the lower lens surface 112 and the fluidic chamber 114 are sealed on the light-transmitting substrate 110, and the light-transmitting elastic film 120 is provided to form the upper lens surface 122 above the lower lens surface 112. Although the light-transmitting elastic film 120 may be directly formed on the light-transmitting substrate 110, the light-transmitting elastic film 120 may be bonded to the light-transmitting substrate 110 through a release sheet 141.

Figure 13:
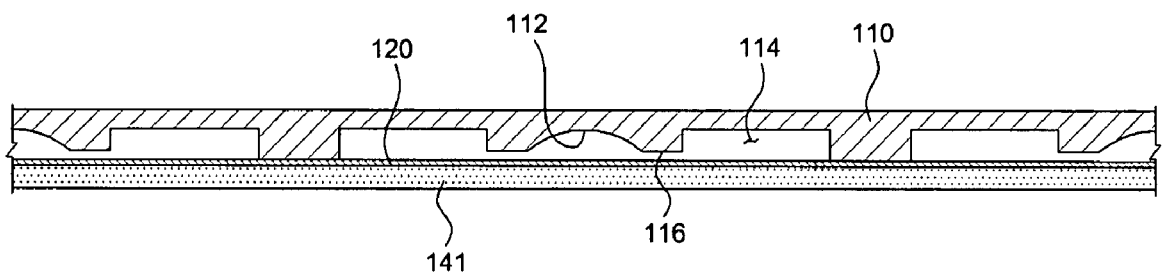
Figure 14:
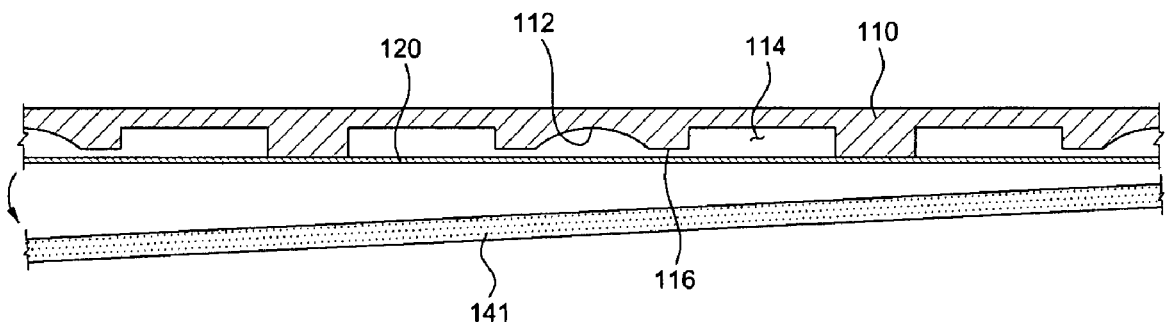

As shown in FIGS. 13 and 14, the providing the light-transmitting elastic film 120 includes forming the light-transmitting elastic film 120 on the release sheet 141, bonding the light-transmitting elastic film 120 formed on the release sheet 141 to the light-transmitting substrate 110, and detaching the release sheet 141 from the light-transmitting elastic film 120.

A hard release sheet or a soft release sheet may be used as the release sheet 141. The light-transmitting elastic film 120 may be formed in such a manner that a transparent or semitransparent elastic material is formed on the release sheet 141 in a thin film type by coating or spin coating.

The light-transmitting elastic film 120 may be formed of a material having the same properties as that of the light-transmitting substrate 110, or different properties from that of the light-transmitting substrate 110 (for example, refractive index and transmissivity). For example, the light-transmitting elastic film 120 may be formed of an elastomer such as PDMS, which is transparent and has excellent durability and flexibility.

Afterwards, the light-transmitting elastic film 120 is bonded to the top surface of the light-transmitting substrate 110 so that the release sheet 141 is bonded thereto. The release sheet 141 is then detached from the light-transmitting elastic film 120, so that the light-transmitting elastic film 120 may be provided on the light-transmitting substrate 110.

Adhesion between the release sheet 141 and the light-transmitting elastic film 120 may have one-time use adhesion, so that the release sheet 141 may selectively be detached from the light-transmitting elastic film 120. Also, adhesion between the light-transmitting elastic film 120 and the light-transmitting substrate 110 may have relatively strong adhesion in comparison with the adhesion between the release sheet 141 and the light-transmitting elastic film 120.

A Teflon coating layer may additionally be formed on the surface of the release sheet 141 before the light-transmitting elastic film 120 is formed on the release sheet 141, to facilitate detachment between the release sheet 141 and the light-transmitting elastic film 120. Conversely, in order to firmly bond the light-transmitting elastic film 120 to the light-transmitting substrate 110, surface treatment such as oxygen ($O_2$) plasma etching may additionally be performed on the adhesive surface between the light-transmitting elastic film 120 and the light-transmitting substrate 110 before the light-transmitting elastic film 120 is bonded to the light-transmitting substrate 110.

The lower lens surface 112 and the upper lens surface 122 may be formed with a convex or concave spherical structure. Alternatively, the lower lens surface 112 and the upper lens surface 122 may be formed with a non-spherical structure.

Next, the actuator 130 is provided on the light-transmitting elastic film 120 to correspond to the fluidic chamber 114, wherein the actuator 130 is varied as the power source is applied thereto. Various related art actuators may be used as the actuator 130.

Preferably, a typical polymer actuator made of an EAP, which is very thin and has low power consumption, may be used as the actuator 130. Examples of the polymer actuator include an electrostrictive polymer such as P(VDF-TrFE) (interpolymer), a dielectric elastomer such as acrylate or silicon, and an ionic polymer such as IPMC, described above with reference to FIG. 5 to FIG. 7.

The polymer actuator 130 may directly be formed on the light-transmitting elastic film 120. Conversely, the polymer actuator 130 may be bonded to the light-transmitting elastic film 120 through a release sheet 142.

Figure 15:
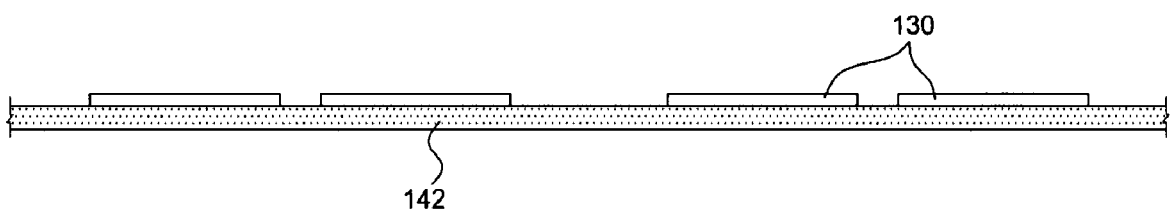
Figure 16:
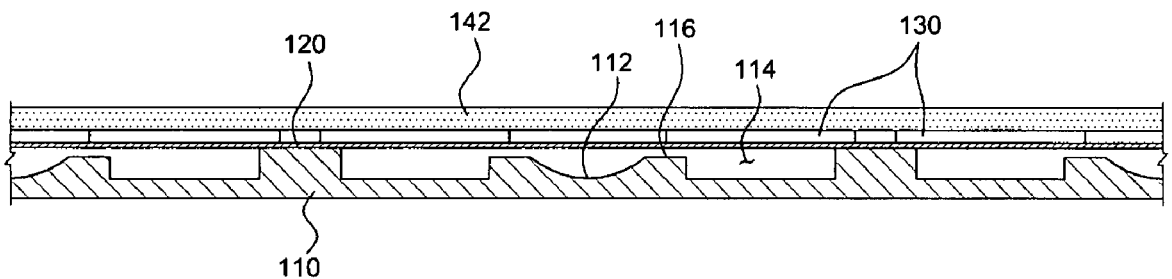
Figure 17:
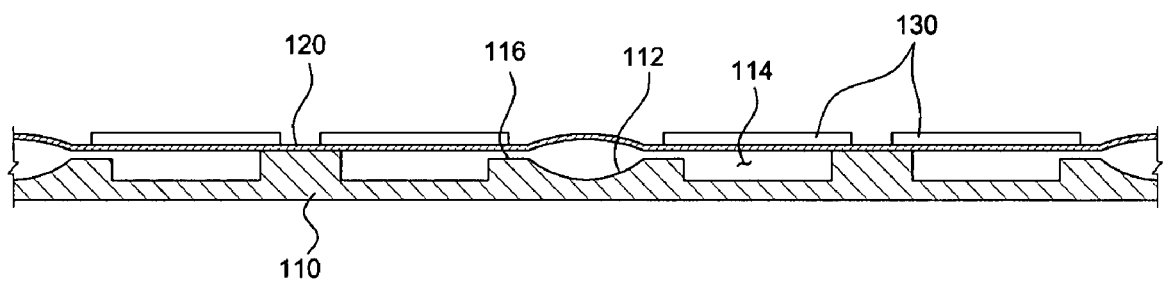

As shown in FIG. 15 to FIG. 17, the providing of the actuator 130 includes forming the actuator 130 on the release sheet 142, bonding the actuator 130 formed on the release sheet 142 to the light-transmitting elastic film 120, and detaching the release sheet 142 from the actuator 130.

A hard release sheet or a soft release sheet may be used as the release sheet 142. The polymer actuator 130 may be formed in such a manner that a polymer and/or electrodes are sequentially deposited on the release sheet.

Next, the polymer actuator 130 is bonded onto the light-transmitting elastic film 120 so that the release sheet 142 is bonded thereto. The release sheet 142 is then detached from the actuator 130, so that the polymer actuator 130 may be provided on the light-transmitting elastic film 120.

Adhesion between the release sheet 142 and the actuator 130 may have one-time use adhesion, so that the release sheet 142 may selectively be detached from the actuator 130. Also, adhesion between the actuator 130 and the light-transmitting elastic film 120 may have relatively strong adhesion in comparison with the adhesion between the release sheet 142 and the actuator 130.

A Teflon coating layer may additionally be formed on the surface of the release sheet 142 before the actuator 130 is formed on the release sheet 142, to facilitate detachment between the release sheet 142 and the actuator 130. Conversely, in order to firmly bond the actuator 130 to the light-transmitting elastic film 120, surface treatment such as $O_2$ plasma etching may additionally be performed on the adhesive surface between the actuator 130 and the light-transmitting elastic film 120 before the actuator 130 is bonded to the light-transmitting elastic film 120.

Figure 18:
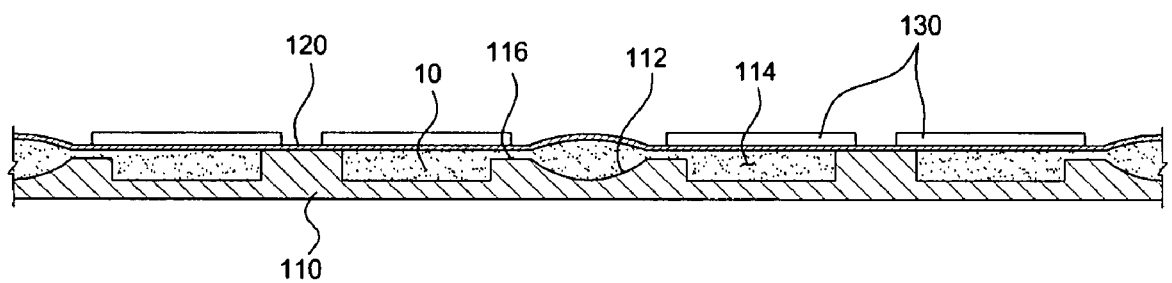

Next, as shown in FIG. 18, an optical fluid 10 such as water or oil is injected into a sealing space sealed by the light-transmitting elastic film 120. The optical fluid 10 may be injected through an injection hole formed at one side of the light-transmitting substrate 110. After the optical fluid is injected into the injection hole, the injection hole is again sealed. In this embodiment, the optical fluid is injected after the actuator 130 is bonded to the light-transmitting elastic film 120. However, the optical fluid may be injected before the actuator 130 is bonded to the light-transmitting elastic film 120.

Figure 19:
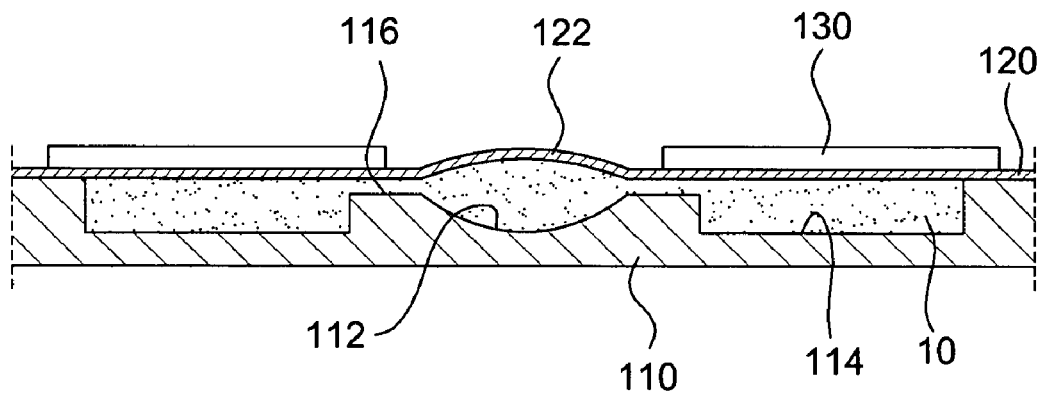

Finally, as shown in FIG. 19, the light-transmitting substrate 110 is diced for each module.

The dicing the light-transmitting substrate 110 may be performed by a general dicing device. The light-transmitting substrate 110 may be divided into individual modules corresponding to the upper lens surface 122, the lower lens surface 112, and the fluidic chamber 114.

Also, an optical lens surface may be formed on a bottom of the aforementioned light-transmitting substrate 110 or inside the light-transmitting substrate 110 to correspond to the lower lens surface 112, so that the optical lens surface may be arranged on a channel of light which passes through the lower lens surface 112. The optical lens surface may be formed with a convex or concave spherical structure. Alternatively, the optical lens surface may be formed with a non-spherical structure. Preferably, the optical lens surface may be formed when the light-transmitting substrate 110 is provided. The optical lens surface may be formed after various parts constituting the optical lens are formed.

Figure 20:
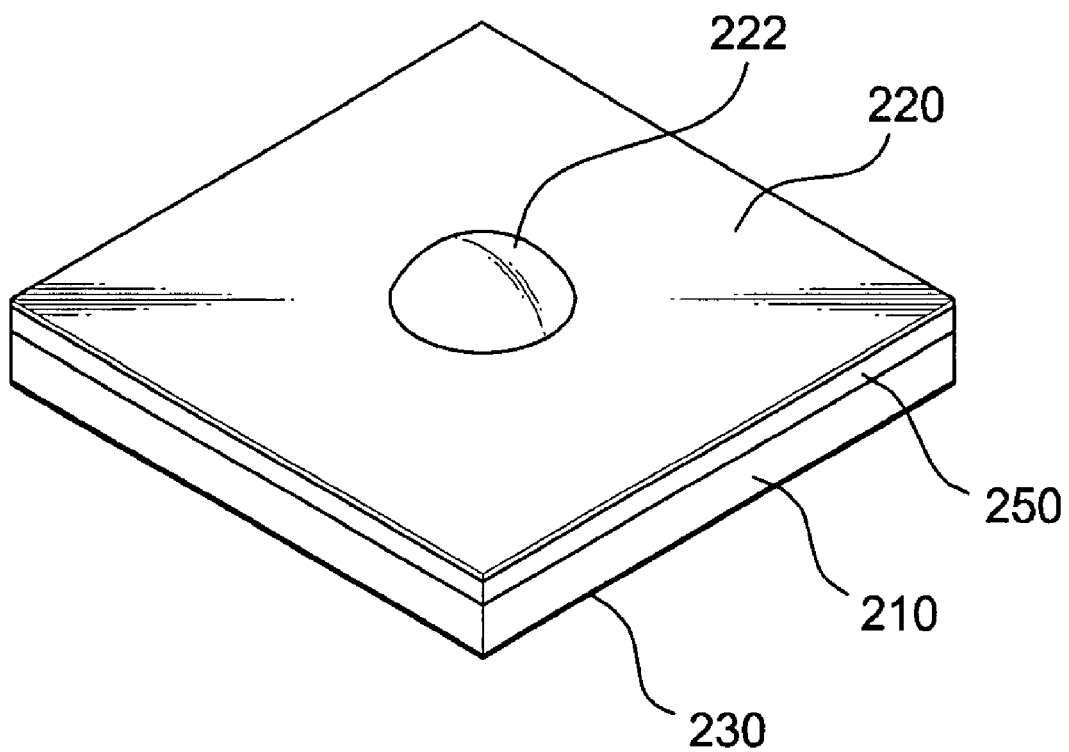
FIG. 20 is a perspective view illustrating a structure of an optical lens according to another exemplary embodiment of the present invention.
Figure 21:
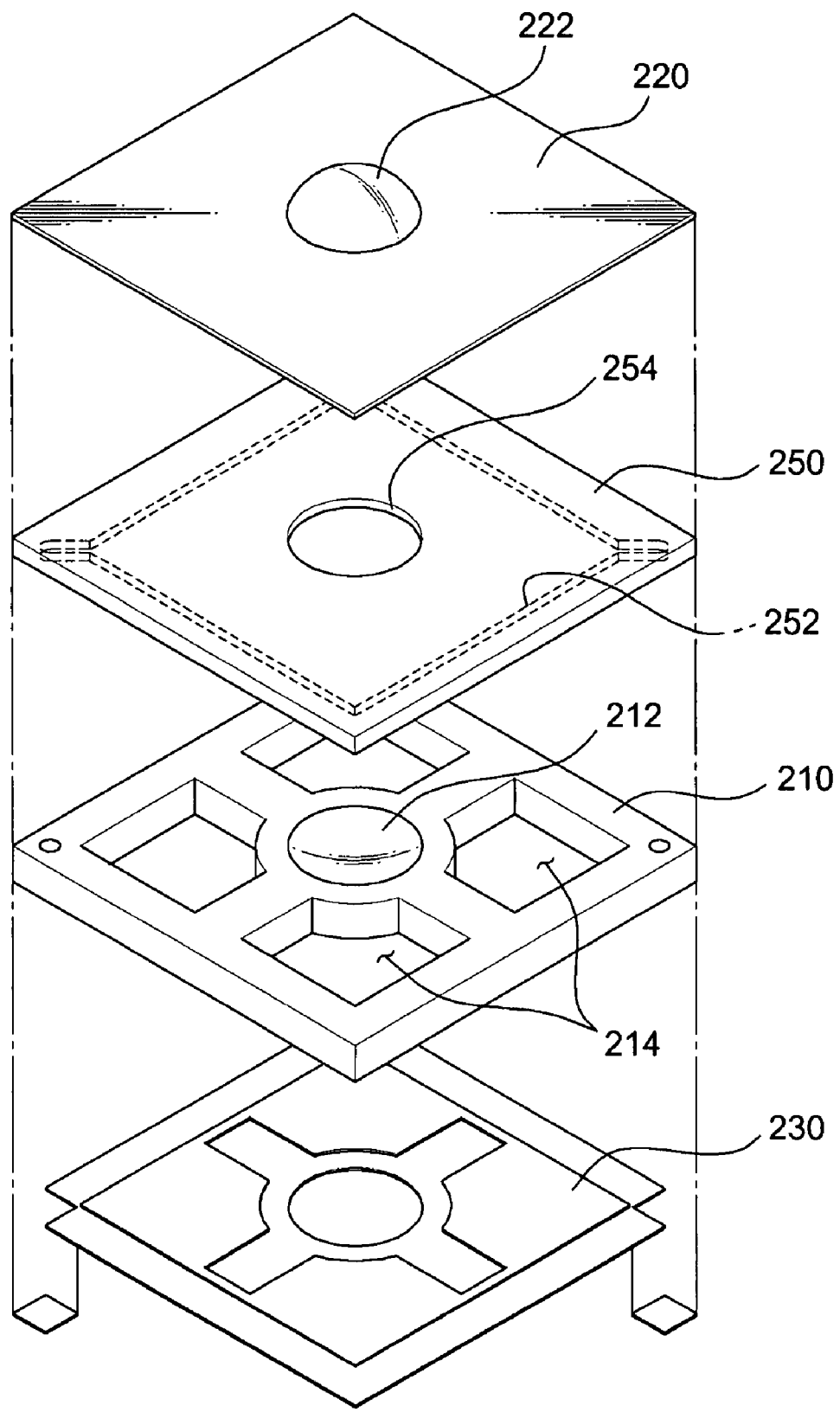
FIGS. 21 and 22 are an exploded perspective view and a partially cut perspective view, respectively, illustrating a structure of an optical lens according to another exemplary embodiment of the present invention.
Figure 22:
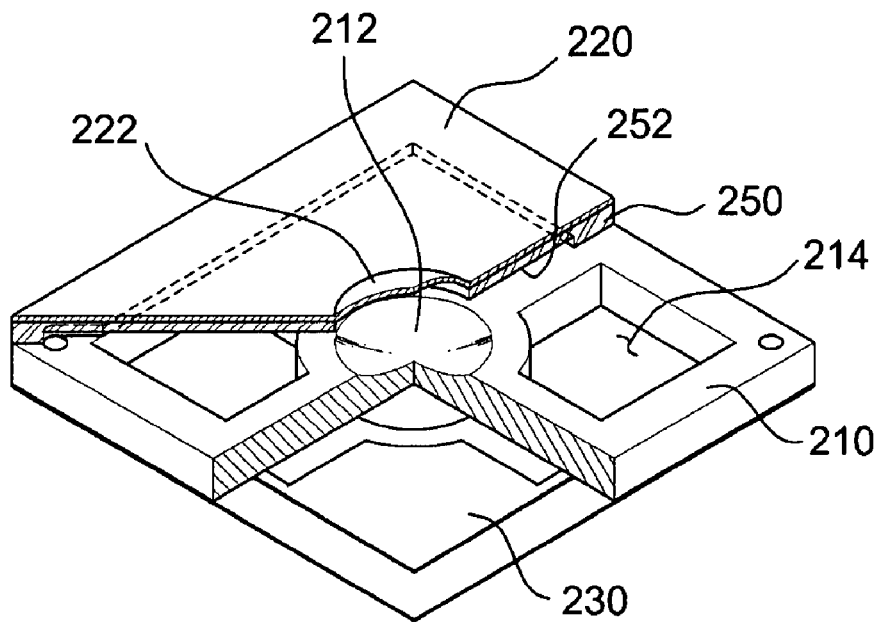
Figure 23:
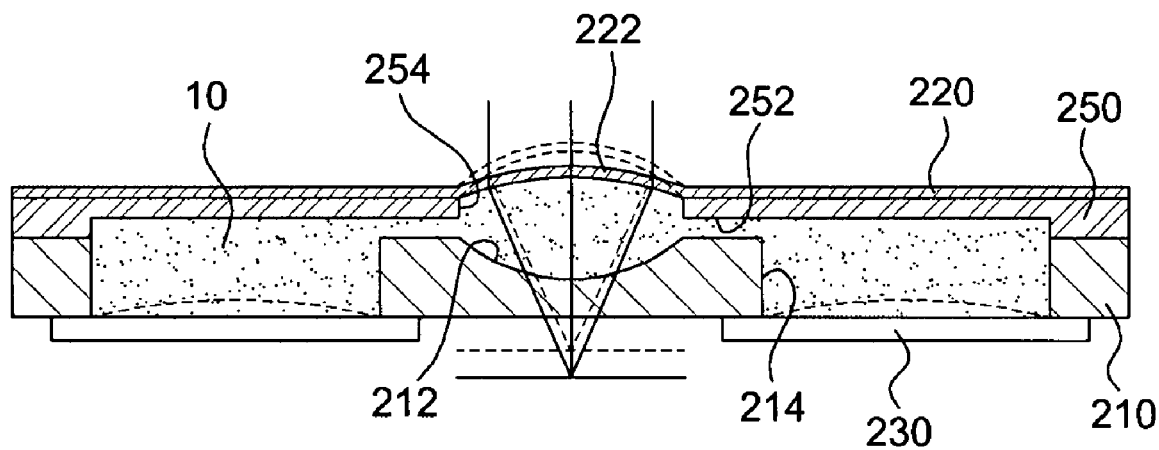
FIG. 23 is a sectional view illustrating a structure of an optical lens according to another exemplary embodiment of the present invention.

FIG. 20 is a perspective view illustrating a structure of an optical lens according to another exemplary embodiment of the present invention. FIGS. 21 and 22 are an exploded perspective view and a partially cut perspective view, respectively, illustrating a structure of an optical lens according to another embodiment of the present invention. FIG. 23 is a sectional view illustrating a structure of an optical lens according to another exemplary embodiment of the present invention.

The same or like reference numbers will be used throughout the drawings to refer to the same or like parts, and their detailed description will be omitted.

As shown in FIG. 20 to FIG. 23, an optical lens 200 according another exemplary embodiment of the present invention includes a light-transmitting substrate 210, a cover substrate 250, a light-transmitting elastic film 220, and an actuator 230.

The light-transmitting substrate 210 is formed of a transparent or semi-transparent light-transmitting material. For example, the light-transmitting substrate 210 may be formed of a transparent glass or silicon. The light-transmitting substrate 210 may be made from a circular wafer of a light-transmitting material, wherein the circular wafer has various sizes such as 4 inches, 6 inches, 8 inches, and 10 inches.

A fluidic chamber 214 having a predetermined depth and a lower lens surface 212 are formed to be exposed on the light-transmitting substrate 210, wherein the lower lens surface 212 is spaced apart from the fluidic chamber 214 at a predetermined distance. The fluidic chamber 214 and the lower lens surface 212 may be formed by etching or a mechanical process.

The cover substrate 250 is tightly bonded to the top surface of the light-transmitting substrate 210 to cover an opening on the fluidic chamber 214. The cover substrate 250 may be formed of a material having the same properties as that of the light-transmitting substrate 210, or may be formed of a material having different properties from that of the light-transmitting substrate 210 (for example, refractive index and transmissivity). Since the cover substrate 250 is not a portion through which light is directly transmitted, unlike the light-transmitting substrate 210 provided with the lower lens surface 212, the cover substrate 250 may be formed of a material having poor light-transmitting performance. For example, the cover substrate 250 may be formed of a polymer molding material, such as silicon or glass.

The cover substrate 250 is provided with a lens hole 254 which passes through the cover substrate 250 in a thickness direction, to be arranged on the same optical axis as that of the lower lens surface 212 to correspond to the lower lens surface 212. The lens hole 254 may be formed by etching or a mechanical process.

Furthermore, bonding between the cover substrate 250 and the light-transmitting substrate 210 may be performed by a typical bonding method. For example, if the cover substrate 250 and the light-transmitting substrate 210 are formed of a typical glass, the cover substrate 250 and the light-transmitting substrate 210 may be bonded to each other by direct bonding without a separate adhesive. As another example, if the cover substrate 250 and the light-transmitting substrate 210 are respectively formed of silicon and glass, the cover substrate 250 and the light-transmitting substrate 210 may be bonded to each other by anodic bonding without a separate adhesive. In addition, the cover substrate 250 and the light-transmitting substrate 210 may be bonded to each other by a typical adhesive.

Furthermore, a channel 252 is formed at one side of opposing surfaces of the light-transmitting substrate 210 and the cover substrate 250, wherein the channel 252 serves to connect the lower lens surface 212 with the fluidic chamber 214. The channel 252 may be formed only on the light-transmitting substrate 210 or the cover substrate 250. Alternatively, the channels may respectively be formed at the opposing surfaces of the light-transmitting substrate 210 and the cover substrate 250 so as to cooperate with each other. Hereinafter, an example of the channel 252 having a predetermined depth will be described, wherein the channel 252 is formed to be exposed to a bottom on the cover substrate 250 only opposite to the light-transmitting substrate 210.

The channel 252 may be formed entirely between the fluidic chamber 214 and the lower lens surface 212. Alternatively, a plurality of channels 252 may be formed at predetermined intervals. Furthermore, a single fluidic chamber 214 may be formed only for the lower lens surface 212. Conversely, a plurality of fluidic chambers 214 may be formed for the lower lens surface 212, wherein the fluidic chambers 214 are connected with one another. The number and arrangement structure of the fluidic chambers 214 may depend on required conditions and design options.

The light-transmitting elastic film 220 is formed of a transparent or semi-transparent elastic material, and is provided on the cover substrate 250 to seal the lens hole 254, whereby an upper lens surface 222 is formed above the lower lens surface 212.

The light-transmitting elastic film 220 may be formed of a material having the same properties as that of the light-transmitting substrate 210, or different properties from that of the light-transmitting substrate 210 (for example, refractive index and transmissivity). For example, the light-transmitting elastic film 220 may be formed of elastomer, such as PDMS, which is transparent and has excellent durability and flexibility.

The light-transmitting elastic film 220 may be bonded to the top surface of the cover substrate 250 in a single body by a typical adhesive or a bonding method, whereby the lens hole 254 is sealed, and a part of the light-transmitting elastic film 220 forms the upper lens surface 222 above the lower lens surface 212. Either a functional coating layer, such as an antireflective coating layer and an anti-infrared coating layer, or a protective layer may be formed on the surface of the light-transmitting elastic film 220.

The lower lens surface 212 and the upper lens surface 222 may have a convex or concave spherical structure. Alternatively, the lower lens surface 212 and the upper lens surface 222 may have a non-spherical structure.

The actuator 230 is provided on a bottom of the light-transmitting substrate 210 to cover a lower opening of the fluidic chamber 214, so that the pressure selectively acting on the upper lens surface 222 may be varied. As a power source is applied, the actuator 230 is strained to be curved up or down, and thus varies the volume of the fluidic chamber 214. Specifically, when the volume of the fluidic chamber 214 is varied by such strain of the actuator 230, the volume of a lens chamber, defined as the space between the upper lens surface 222 and the lower lens surface 212, and connected with the fluidic chamber 214, is also varied. As a result, the pressure acting on the upper lens surface 222 is varied and strain is caused, whereby a focal distance by the upper lens surface 222 and the lower lens surface 212 may be varied.

Various related art actuators may be used as the actuator 230. Preferably, a polymer actuator made of an EAP, which is very thin and has low power consumption, may be used as the actuator 230.

Examples of the polymer actuator include an electrostrictive polymer such as P(VDF-TrFE) (interpolymer), a dielectric elastomer such as acrylate or silicon, and an ionic polymer such as IPMC.

Also, an optical fluid 10 such as water or oil may be injected into a sealing space sealed by the light-transmitting elastic film 220 and the actuator 230. Specifically, an injection hole for injecting the optical fluid 10 may be formed at one side of the light-transmitting substrate 210 or the cover substrate 250. After the optical fluid is injected into the injection hole, the injection hole is again sealed.

As described above, in the optical lens according to another exemplary embodiment of the present invention, one side of the channel 252 which connects the fluidic chamber 214 with the space between the respective lens surfaces is not formed by the light-transmitting elastic film 220 which is elastically strained, but is formed between the light-transmitting substrate 210 and the cover substrate 250 which are more rigid than the light-transmitting elastic film 220, whereby the exact amount of the fluid can be dispensed when the hydraulic pressure (or flow) is applied to the fluid.

In particular, this structure prevents local strain from unstably occurring in a boundary portion between each of the lens surfaces 212 and 222 and the channel 252, whereby the exact amount of the fluid can uniformly be dispensed. Also, this structure reduces the motion time of the optical fluid 10 to reduce the response time required for focusing, prevents the operation pressure from rapidly increasing, and thus prevents reliability and stability from decreasing.

Hereinafter, a method for manufacturing an optical lens according to another exemplary embodiment of the present invention will be described.

FIG. 24 to FIG. 32 are sectional views illustrating a method for manufacturing an optical lens according to another exemplary embodiment of the present invention.

The optical lens according to another exemplary embodiment of the present invention can be manufactured in a wafer-level process which includes providing a light-transmitting substrate 210 with a lower lens surface 212 and a fluidic chamber 214, and a cover substrate provided with a lens hole 254; forming a channel 252 at one side of the light-transmitting substrate 210 and the cover substrate 250, the channel 252 connecting the lower lens surface 212 with a fluidic chamber 214; bonding the cover substrate 250 to the light-transmitting substrate 210 to arrange the channel 252 between the light-transmitting substrate 210 and the cover substrate 250; providing a light-transmitting elastic film 220 on the cover substrate 250 to seal the lens hole 254 and form an upper lens surface 222 above the lower lens surface 212; providing an actuator 230 to a bottom of the light-transmitting substrate 210 to cover a lower portion of the fluidic chamber 214, the actuator 230 being strained as the power is applied thereto; and dicing the light-transmitting substrate 210 to provide individual modules corresponding to the upper lens surface 222, the lower lens surface 212, and the fluidic chamber 214.

Figure 24:
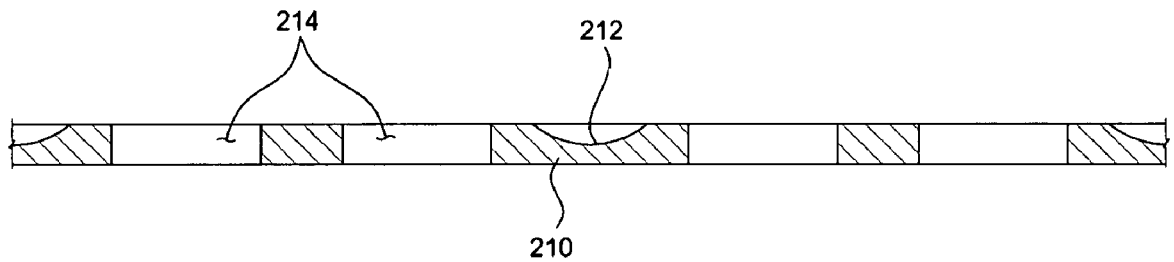
FIG. 24 to FIG. 32 are sectional views illustrating a method for manufacturing an optical lens according to another exemplary embodiment of the present invention.

In the providing of the light-transmitting substrate 210 and the cover substrate 250, as shown in FIG. 24, the light-transmitting substrate 210 formed of a transparent or semitransparent light-transmitting material is prepared. For example, the light-transmitting substrate 210 is a related art transparent glass, and may be formed at various sizes such as 4 inches, 6 inches, 8 inches, and 10 inches.

Figure 25:
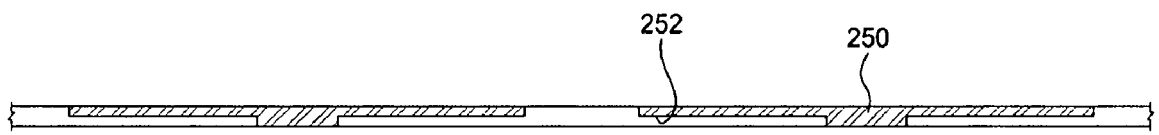

As shown in FIG. 25, the cover substrate 250 is prepared, which is formed of a material having the same properties as that of the light-transmitting substrate 210, or a material having different properties from that of the light-transmitting substrate 210 (for example, refractive index and transmissivity). Since the cover substrate 250 is not a portion through which light is directly transmitted, unlike the light-transmitting substrate 210 provided with the lower lens surface 212, the cover substrate 250 may be formed of a material having poor light-transmitting performance. For example, the cover substrate 250 may be formed of a polymer molding material such as silicon or glass.

Here, the light-transmitting substrate 210 is provided with a fluidic chamber 214 and a lower lens surface 212, which are formed to be exposed to the top surface, wherein the fluidic chamber 214 and the lower lens surface 212 are spaced apart from each other. The cover substrate 250 is provided with a lens hole 254 which passes through the cover substrate 250 in a thickness direction to be arranged on the same optical axis as that of the lower lens surface 212 to correspond to the lower lens surface 212. The fluidic chamber 214, the lower lens surface 212 and the lens hole 254 may be formed by typical etching or a mechanical process.

Next, a channel 252 is formed at one side of opposing surfaces of the light-transmitting substrate 210 and the cover substrate 250, wherein the channel 252 serves to connect the lower lens surface 212 with the fluidic chamber 214. The channel 252 may be formed only on the light-transmitting substrate 210 or the cover substrate 250. Alternatively, the channels may respectively be formed at the opposing surfaces of the light-transmitting substrate 210 and the cover substrate 250. Hereinafter, as shown in FIG. 25, an example of the channel 252 having a predetermined depth will be described, wherein the channel 252 is formed to be exposed to a bottom of the cover substrate 250 opposite to the light-transmitting substrate 210.

The channel 252 may be formed entirely between the fluidic chamber 214 and the lower lens surface 212. Alternatively, a plurality of channels 252 may be formed at predetermined intervals. Furthermore, a single fluidic chamber 214 may be formed only for the lower lens surface 212. Conversely, a plurality of fluidic chambers 214 may be formed for the lower lens surface 212, wherein the fluidic chambers 214 are connected with one another. The number and arrangement structure of the fluidic chambers 214 may depend on required conditions and design options.

Figure 26:
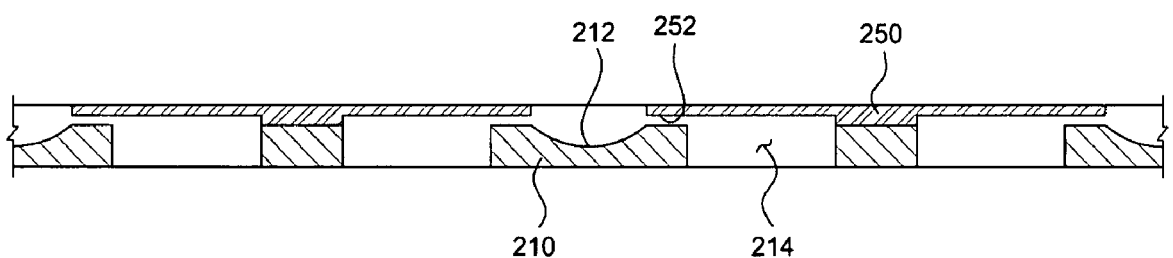

Next, as shown in FIG. 26, the cover substrate 250 is bonded to the light-transmitting substrate 250 so that the channel 252 may be arranged between the light-transmitting substrate 210 and the cover substrate 250. Bonding between the cover substrate 250 and the light-transmitting substrate 210 may be performed by a typical bonding method. The bonding method may depend on the material of the cover substrate 250 and the light-transmitting substrate 210. For example, if the cover substrate 250 and the light-transmitting substrate 210 are formed of a typical glass, the cover substrate 250 and the light-transmitting substrate 210 may be bonded to each other by direct bonding without a separate adhesive. As another example, if the cover substrate 250 and the light-transmitting substrate 210 are respectively formed of silicon and glass, the cover substrate 250 and the light-transmitting substrate 210 may be bonded to each other by anodic bonding without a separate adhesive. In addition, the cover substrate 250 and the light-transmitting substrate 210 may be bonded to each other by a typical adhesive.

Figure 27:
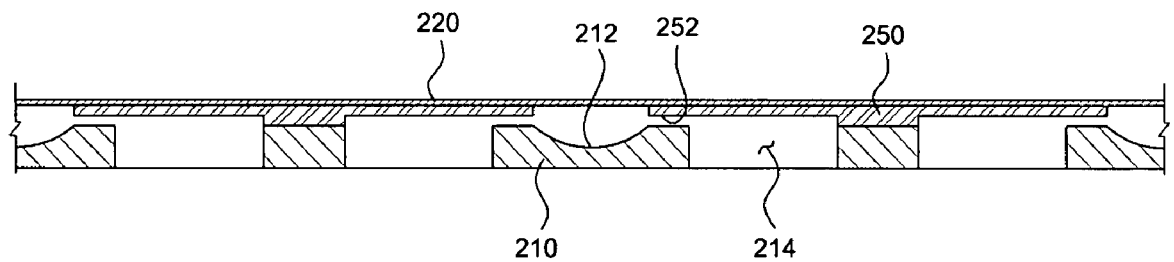

Afterwards, as shown in FIG. 27, the lens hole 254 is sealed on the cover substrate 250, and the light-transmitting elastic film 220 is provided to form the upper lens surface 222 above the lower lens surface 212. Although the light-transmitting elastic film 220 may be directly formed on the cover substrate 250, the light-transmitting elastic film 220 may be bonded to the cover substrate 250 through a release sheet 242.

Specifically, the providing the light-transmitting elastic film 220 includes forming the light-transmitting elastic film 220 on the release sheet 242, bonding the light-transmitting elastic film 220 formed on the release sheet 242 to the cover substrate 250, and detaching the release sheet 242 from the light-transmitting elastic film 220, as described with reference to FIGS. 13 and 14.

A hard release sheet or a soft release sheet may be used as the release sheet 242. The light-transmitting elastic film 220 may be formed in such a manner that a transparent or semi-transparent elastic material is formed on the release sheet 242 in a thin film type by coating or spin coating.

The light-transmitting elastic film 220 may be formed of a material having the same properties as that of the light-transmitting substrate 210, or a material having different properties from that of the light-transmitting substrate 210 (for example, refractive index and transmissivity). For example, the light-transmitting elastic film 220 may be formed of elastomer such as PDMS, which is transparent and has excellent durability and flexibility.

Next, the light-transmitting elastic film 220 is bonded onto the cover substrate 250 so that the release sheet is bonded thereto. The release sheet 242 is then detached from the light-transmitting elastic film 220, so that the light-transmitting elastic film 220 may be provided on the cover substrate 250.

Adhesion between the release sheet 242 and the light-transmitting elastic film 220 may have one-time use adhesion, so that the release sheet may selectively be detached from the light-transmitting elastic film 220. Also, adhesion between the light-transmitting elastic film 220 and the cover substrate 250 may have relatively strong adhesion in comparison with the adhesion between the release sheet 242 and the light-transmitting elastic film 220.

A Teflon coating layer may additionally be formed on the surface of the release sheet 242 before the light-transmitting elastic film 220 is formed on the release sheet 242, to facilitate detachment between the release sheet and the light-transmitting elastic film 220. Conversely, in order to firmly bond the light-transmitting elastic film 120 to the cover substrate 250, surface treatment such as $O_2$ plasma etching may additionally be performed on the adhesive surface between the light-transmitting elastic film 220 and the cover substrate 250 before the light-transmitting elastic film 220 is bonded to the cover substrate 250.

The lower lens surface 212 and the upper lens surface 222 formed on the light-transmitting substrate 210 and the light-transmitting elastic film 220 may be formed with a convex or concave spherical structure. Alternatively, the lower lens surface 212 and the upper lens surface 222 may be formed with a non-spherical structure.

Next, the actuator 230 is provided on a bottom of the light-transmitting substrate 210 to correspond to the fluidic chamber 214, wherein the actuator 230 is varied as the power source is applied thereto. Various related art actuators may be used as the actuator 230.

Preferably, a typical polymer actuator made of an EAP, which is very thin and has low power consumption, may be used as the actuator 230. Examples of the polymer actuator include an electrostrictive polymer such as P(VDF-TrFE) (interpolymer), a dielectric elastomer such as acrylate or silicon, and an ionic polymer such as IPMC.

The polymer actuator 230 may be formed directly on the light-transmitting substrate 210. Conversely, the polymer actuator 230 may be bonded to the light-transmitting substrate 210 through a release sheet 242.

Figure 28:
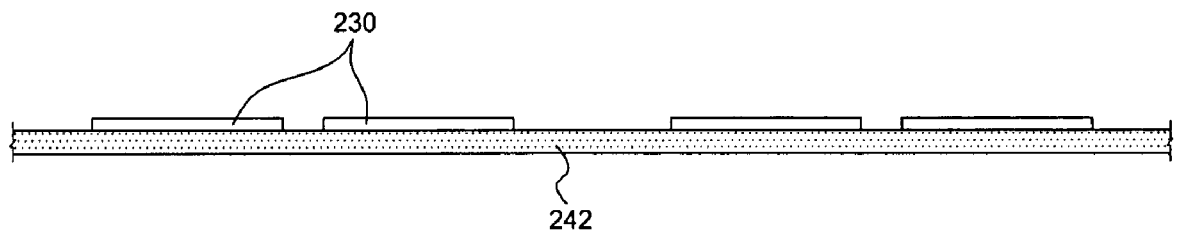
Figure 29:
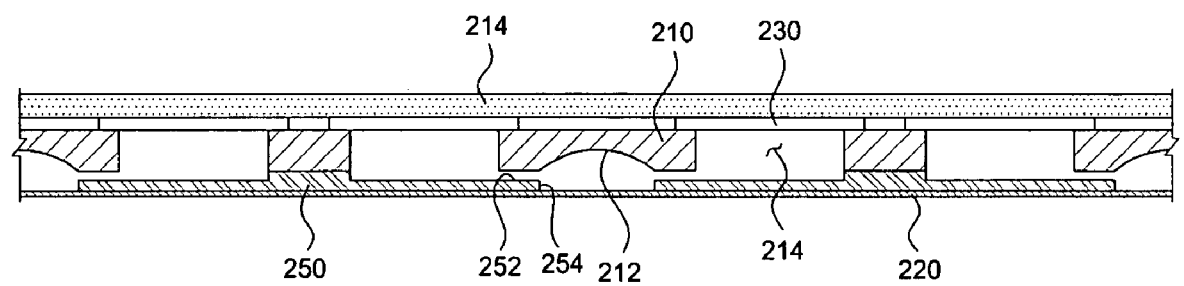
Figure 30:
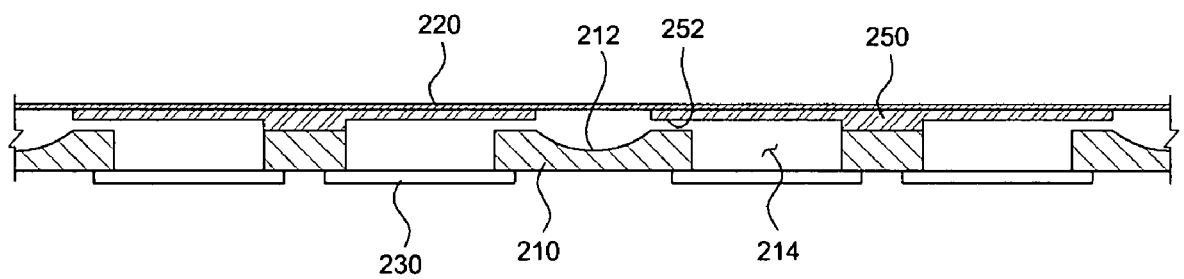

As shown in FIG. 28 to FIG. 30, the providing the actuator 230 includes forming the actuator 230 on the release sheet 242, bonding the actuator 230 formed on the release sheet 242 to the light-transmitting substrate 210, and detaching the release sheet 242 from the actuator 230.

A hard release sheet or a soft release sheet may be used as the release sheet 242. The polymer actuator 230 may be formed in such a manner that a polymer and/or electrodes are sequentially deposited on the release sheet 242.

Next, the polymer actuator 230 is bonded onto a bottom of the light-transmitting substrate 210 so that the release sheet 242 is bonded thereto. The release sheet 242 is then detached from the actuator 230, so that the polymer actuator 230 may be provided on the light-transmitting substrate 210.

Adhesion between the release sheet 242 and the actuator 230 may have one-time use adhesion, so that the release sheet 242 may selectively be detached from the actuator 230. Also, adhesion between the actuator 230 and the light-transmitting substrate 210 may have relatively strong adhesion in comparison with the adhesion between the release sheet 242 and the actuator 230.

A Teflon coating layer may additionally be formed on the surface of the release sheet 242 before the actuator 230 is formed on the release sheet 242, to facilitate detachment between the release sheet 242 and the actuator 230. Conversely, in order to firmly bond the actuator 230 to the light-transmitting substrate 210, surface treatment such as $O_2$ plasma etching may additionally be performed on the adhesive surface between the actuator 230 and the light-transmitting elastic film 220 before the actuator 230 is bonded to the light-transmitting substrate 210.

Figure 31:
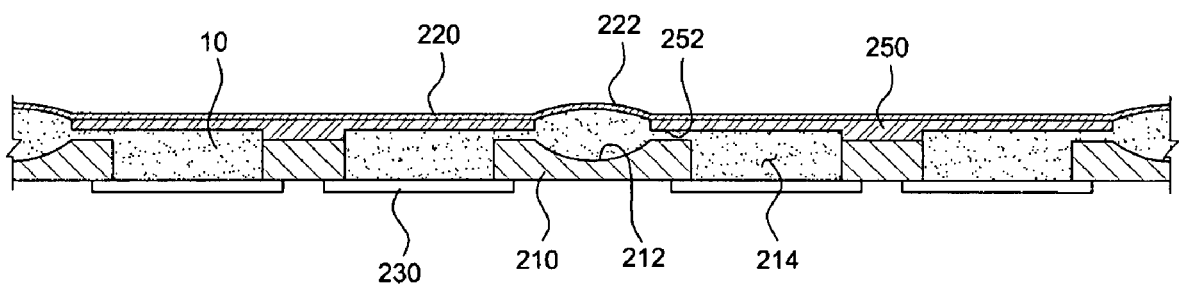

Next, as shown in FIG. 31, an optical fluid 10 such as water or oil is injected into a sealing space sealed by the light-transmitting elastic film 220 and the actuator 230. The optical fluid 10 may be injected through an injection hole formed at one side of the light-transmitting substrate 210 or the cover substrate 250. After the optical fluid is injected into the injection hole, the injection hole is again sealed. In the current embodiment, the optical fluid 10 is injected after the actuator 230 is bonded to the light-transmitting substrate 210. However, the optical fluid may be injected before the actuator 230 is bonded to the light-transmitting substrate 210.

Figure 32:
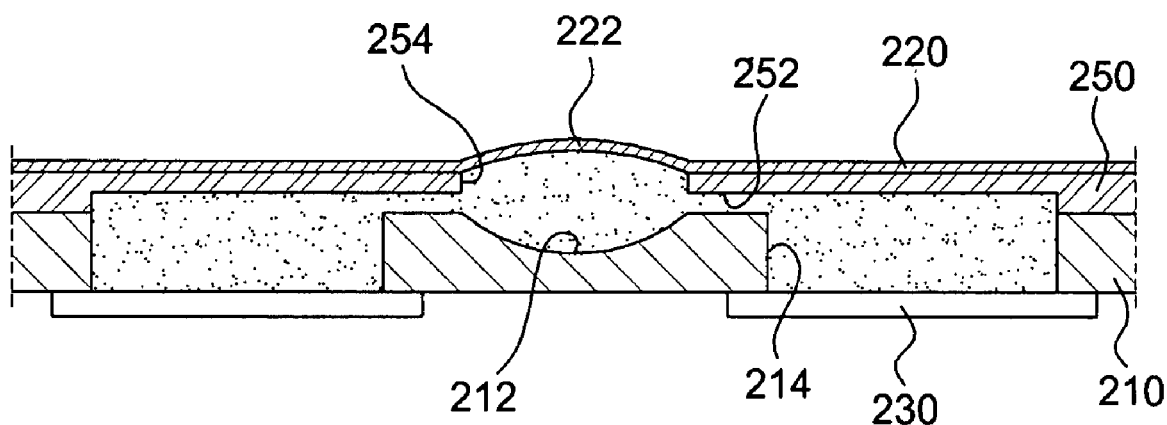

Finally, as shown in FIG. 32, the light-transmitting substrate 210 is diced for each module.

The dicing the light-transmitting substrate 210 may be performed by a general dicing device. The light-transmitting substrate 210 may be divided into individual modules corresponding to the upper lens surface 222, the lower lens surface 212, and the fluidic chamber 214.

Also, an optical lens surface may be formed on a bottom of the aforementioned light-transmitting substrate 210 or inside the light-transmitting substrate 210 to correspond to the lower lens surface 212, so that the optical lens surface may be arranged on a channel of light which passes through the lower lens surface 212. The optical lens surface may be formed with a convex or concave spherical structure. Alternatively, the optical lens surface may be formed with a non-spherical structure. Preferably, the optical lens surface may be formed when the light-transmitting substrate 210 is provided. The optical lens surface may be formed after various parts constituting the optical lens 200 are formed.

Figure 33:
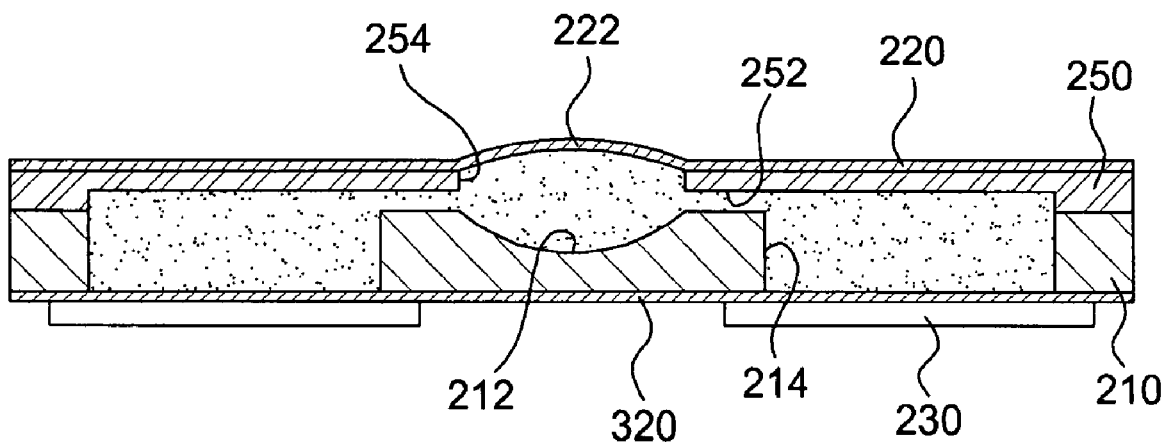
FIG. 33 to FIG. 35 are sectional views illustrating a structure of an optical lens according to another exemplary embodiment of the present invention.
Figure 34:
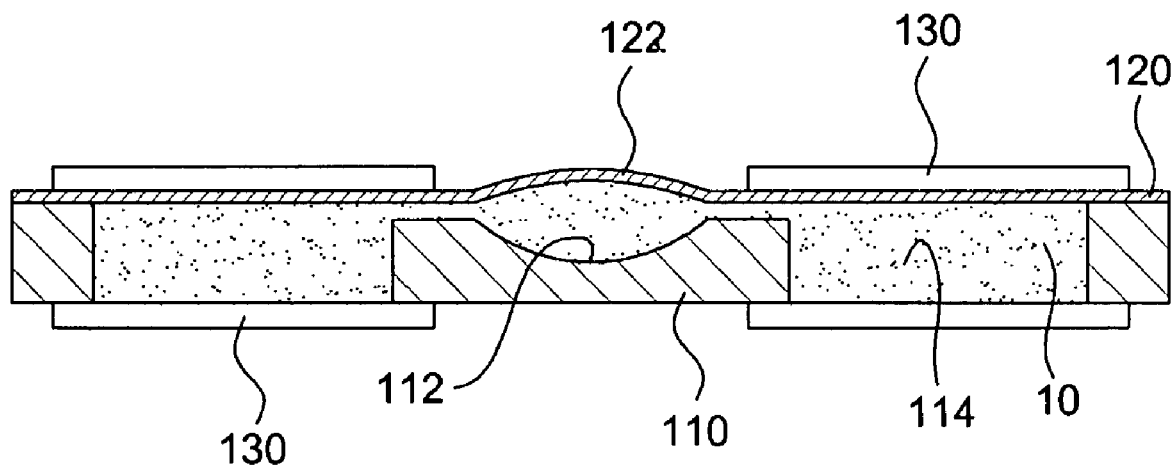
Figure 35:
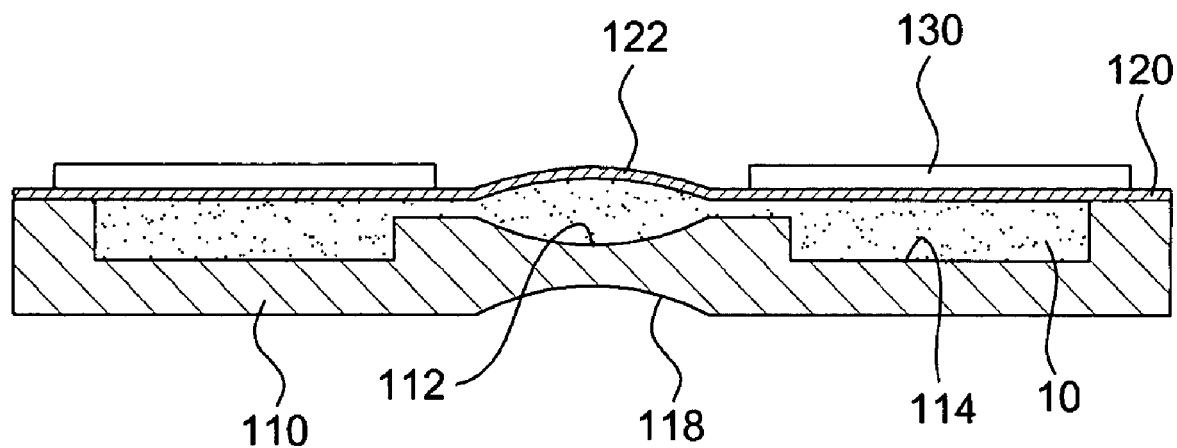

Also, FIG. 33 to FIG. 35 are sectional views illustrating a structure of an optical lens according to another exemplary embodiment of the present invention. The same or like reference numbers will be used throughout the drawings to refer to the same or like parts, and their detailed description will be omitted.

In the aforementioned embodiments as shown, while it has been described that the actuator 230 is directly bonded to a bottom of the light-transmitting substrate 210, a buffer elastic film 320 may be provided on a bottom of the light-transmitting substrate 210 before the actuator 230 is bonded to a bottom of the light-transmitting substrate 210, as shown in FIG. 33. The buffer elastic film 320 may be formed of the same material as the light-transmitting elastic film 220, or a different material from the light-transmitting elastic film 220. Since the buffer elastic film 320 is not a portion through which light is directly transmitted, unlike the light-transmitting elastic film 220, the buffer elastic film 320 may be formed of a material having poor light-transmitting performance. Preferably, the buffer elastic film 320 may be formed of a material having an elastic modulus equivalent to that of the light-transmitting elastic film 220, to improve efficiency of the actuator 230.

Furthermore, in the aforementioned embodiments as shown, while it has been described that the actuator 130 is provided at one side of the upper or lower portions of the fluidic chamber, the actuators 130 may respectively be formed at the upper or lower portions of the fluidic chamber 114 as shown in FIG. 34, so that the actuators 130 may be independently driven.

Furthermore, in the aforementioned embodiments as shown, while it has been described that the lens portion includes the lower lens surface and the upper lens surface, the optical lens surface 118 may be formed on a bottom of the light-transmitting substrate 110 to correspond to the lower lens surface 112, so that the optical lens surface 118 may be arranged on a channel of light which passes through the lower lens surface 112. The optical lens surface 118 may have a convex or concave spherical structure. Alternatively, the optical lens surface 118 may have a non-spherical structure. The optical lens surface may be formed inside the light-transmitting substrate.

As described above, the optical lens and a method for manufacturing the same according to the present invention have the following advantages.

Since the structure of the optical lens and its manufacturing process are simplified, the optical lens can be manufactured with miniaturization and thin size, the cost can be reduced, and productivity can be improved.

In particular, since the optical lens can be manufactured in a wafer-level process, it is advantageous in view of mass production, and the manufacturing cost can be reduced to reduce the cost of the product.

Furthermore, since the whole height of the product, such as a camera module, for the optical lens is lowered, the product can be manufactured to be small and slim.

Furthermore, since the actuator is provided through the elastic film having a relatively low elastic modulus, the power consumption is minimized, and the strain of the actuator can be maximized under the same power.

Furthermore, it is possible to reduce the response time required for focusing.

Finally, since the fluid can uniformly be dispensed when the hydraulic pressure (or flow) is applied to the fluid, it is possible to prevent reliability and stability from decreasing.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical lens comprising:
   a light-transmitting substrate which comprises a lens chamber and a fluidic chamber, wherein the lens chamber and the fluidic chamber are connected with each other;
   a light-transmitting elastic film which seals the lens chamber;
   a buffer elastic film which seals the fluidic chamber; and
   an actuator on the buffer elastic film which corresponds to the fluidic chamber, and varies a volume of the fluidic chamber to vary a curvature of the light-transmitting elastic film,
   wherein the actuator comprises a polymer actuator including an inactive area and an active area, and the buffer elastic film has an elastic modulus lower than an elastic modulus of the polymer actuator so that the buffer elastic film does not bind the actuator when the actuator is curved.

2. The optical lens of claim 1, wherein the light-transmitting elastic film and the buffer elastic film are connected with each other to form a single body.

3. The optical lens of claim 1, wherein the light-transmitting elastic film and the buffer elastic film are detached from each other.

4. The optical lens of claim 1, wherein the light-transmitting elastic film and the buffer elastic film are formed of the same material.

5. The optical lens of claim 1, wherein the light-transmitting elastic film and the buffer elastic film are formed of different materials.

6. An optical lens comprising:
   a light-transmitting substrate which comprises a lower lens surface and a fluidic chamber, wherein the lower lens surface and the fluidic chamber are connected with each other;
   a light-transmitting elastic film on the light-transmitting substrate which seals the lower lens surface and the fluidic chamber, and forms a variable upper lens surface above the lower lens surface; and
   an actuator on the light-transmitting elastic film which corresponds to the fluidic chamber and is strained if a power source is applied thereto, which varies a volume of the fluidic chamber,
   wherein the actuator comprises a polymer actuator including an inactive area and an active area, and the light-transmitting elastic film has an elastic modulus lower than an elastic modulus of the polymer actuator so that the light-transmitting elastic film does not bind the actuator when the actuator is curved.

7. The optical lens of claim 6, wherein the light-transmitting substrate comprises an externally exposed channel, and the channel connects the lower lens surface with the fluidic chamber, and is covered by the light-transmitting elastic film.

8. The optical lens of claim 6, wherein at least one of the lower lens surface and the upper lens surface has a spherical structure.

9. The optical lens of claim 6, wherein at least one of the lower lens surface and the upper lens surface has a non-spherical structure.

10. The optical lens of claim 6, wherein the light-transmitting substrate further comprises an optical lens surface on a channel of light that passes through the lower lens surface.

11. The optical lens of claim 10, wherein the optical lens surface has a spherical structure.

12. The optical lens of claim 10, wherein the optical lens surface has a non-spherical structure.

13. The optical lens of claim 6, wherein the polymer actuator is formed of any one of an electrostrictive polymer, a dielectric elastomer, and an ionic polymer.

14. The optical lens of claim 6, wherein the light-transmitting elastic film is formed of polydimethylsiloxane (PDMS).

15. An optical lens comprising:
   a light-transmitting substrate which comprises a lower lens surface and a fluidic chamber, wherein the lower lens surface and the fluidic chamber are spaced apart from each other;
   a cover substrate with a lens hole which is formed to correspond to the lower lens surface and which is provided on the light-transmitting substrate to cover an upper portion of the fluidic chamber;
   a light-transmitting elastic film on the cover substrate which seals the lens hole and forms an upper lens surface above the lower lens surface; and
   an actuator on a bottom of the light-transmitting substrate which covers a lower portion of the fluidic chamber, and is strained if a power source is applied thereto, which varies a volume of the fluidic chamber,
   wherein a channel is formed of at least one of opposing surfaces of the light-transmitting substrate and the cover substrate, and the channel connects the lower lens surface with the fluidic chamber.

16. The optical lens of claim 15, wherein the light-transmitting substrate and the cover substrate are formed of the same material.

17. The optical lens of claim 15, wherein the light-transmitting substrate and the cover substrate are formed of different materials.

18. The optical lens of claim 15, wherein at least one of the lower lens surface and the upper lens surface has a spherical structure.

19. The optical lens of claim 15, wherein at least one of the lower lens surface and the upper lens surface has a non-spherical structure.

20. The optical lens of claim 15, wherein the light-transmitting substrate further comprises an optical lens surface on a channel of light that passes through the lower lens surface.

21. The optical lens of claim 20, wherein the optical lens surface has a spherical structure.

22. The optical lens of claim 20, wherein the optical lens surface has a non-spherical structure.

23. The optical lens of claim 15, wherein the actuator comprises a polymer actuator which is formed of any one of an electrostrictive polymer, a dielectric elastomer, and an ionic polymer.

24. The optical lens of claim 15, wherein the light-transmitting elastic film is formed of polydimethylsiloxane (PDMS).

25. An optical lens comprising:
   a light-transmitting substrate which comprises a lower lens surface and a fluidic chamber, wherein the lower lens surface and the fluidic chamber are spaced apart from each other;
   a cover substrate with a lens hole which is formed to correspond to the lower lens surface and which is provided on the light-transmitting substrate to cover an upper portion of the fluidic chamber;
   a light-transmitting elastic film on the cover substrate which seals the lens hole and forms an upper lens surface above the lower lens surface;

a buffer elastic film on a bottom of the light-transmitting substrate which covers a lower portion of the fluidic chamber; and an actuator on the light-transmitting elastic film which corresponds to the fluidic chamber, and is strained if a power source is applied thereto, which varies the volume of the fluidic chamber, wherein a channel is formed of at least one of opposing surfaces of the light-transmitting substrate and the cover substrate, and the channel connects the lower lens surface with the fluidic chamber.

26. The optical lens of claim 25, wherein at least one of the lower lens surface and the upper lens surface has a spherical structure.

27. The optical lens of claim 25, wherein at least one of the lower lens surface and the upper lens surface has a non-spherical structure.

28. The optical lens of claim 25, wherein the light-transmitting substrate further comprises an optical lens surface on a channel of light that passes through the lower lens surface.

29. The optical lens of claim 28, wherein the optical lens surface has a spherical structure.

30. The optical lens of claim 28, wherein the optical lens surface has a non-spherical structure.

31. The optical lens of claim 25, wherein the actuator comprises a polymer actuator which is formed of any one of an electrostrictive polymer, a dielectric elastomer, and an ionic polymer.

32. The optical lens of claim 25, wherein the light-transmitting elastic film is formed of polydimethylsiloxane (PDMS).

33. A method for manufacturing an optical lens, comprising:

providing a light-transmitting substrate comprising a lower lens surface and a fluidic chamber, wherein the lens chamber and the fluidic chamber are spaced apart from each other and are connected with each other;

providing a light-transmitting elastic film on the light-transmitting substrate to seal the lower lens surface and the fluidic chamber, and to form an upper lens surface above the lower lens surface;

providing an actuator on the light-transmitting elastic film to correspond to the fluidic chamber, wherein the actuator is strained if a power source is applied thereto; and dicing the light-transmitting substrate to provide individual modules corresponding to the upper and lower lens surfaces and the fluidic chamber.

34. The method of claim 33, further comprising injecting an optical fluid into a space sealed by the light-transmitting elastic film.

35. The method of claim 33, further comprising forming an optical lens surface on the light-transmitting substrate so that the optical lens is arranged on a channel of light that passes through the lower lens surface.

36. The method of claim 35, wherein the optical lens surface has a spherical structure.

37. The method of claim 35, wherein the optical lens surface has a non-spherical structure.

38. The method of claim 33, wherein the providing the light-transmitting elastic film comprises:

forming the light-transmitting elastic film on a release sheet;

bonding the light-transmitting elastic film formed on the release sheet to the light-transmitting substrate; and detaching the release sheet from the light-transmitting elastic film.

39. The method of claim 33, wherein the providing the actuator includes:

forming the actuator on a release sheet;

bonding the actuator formed on the release sheet to the light-transmitting elastic film; and detaching the release sheet from the actuator.

40. The method of claim 33, wherein the providing the light-transmitting substrate includes forming a channel on the light-transmitting substrate, wherein the channel is externally exposed and connects the lower lens surface with the fluidic chamber.

41. The method of claim 33, wherein at least one of the lower lens surface and the upper lens surface has a spherical structure.

42. The method of claim 33, wherein at least one of the lower lens surface and the upper lens surface has a non-spherical structure.

43. The method of claim 33, wherein the actuator comprises a polymer actuator which is formed of any one of an electrostrictive polymer, a dielectric elastomer, and an ionic polymer.

44. The method of claim 33, wherein the light-transmitting elastic film is formed of polydimethylsiloxane (PDMS).

45. A method for manufacturing an optical lens, comprising:

providing a light-transmitting substrate comprising a lower lens surface and a fluidic chamber, and a cover substrate comprising a lens hole;

forming a channel at one of the light-transmitting substrate and the cover substrate, wherein the channel connects the lower lens surface with the fluidic chamber;

bonding the cover substrate to the light-transmitting substrate to arrange the channel between the light-transmitting substrate and the cover substrate;

providing a light-transmitting elastic film on the cover substrate to seal the lens hole and form an upper lens surface above the lower lens surface;

providing an actuator on a bottom of the light-transmitting substrate to cover a lower portion of the fluidic chamber, wherein the actuator is strained if a power source is applied thereto; and dicing the light-transmitting substrate to provide individual modules corresponding to the upper and lower lens surfaces and the fluidic chamber.

46. The method of claim 45, further comprising injecting an optical fluid into a space sealed by the light-transmitting elastic film.

47. The method of claim 45, further comprising forming an optical lens surface on the light-transmitting substrate so that the optical lens is arranged on a channel of light that passes through the lower lens surface.

48. The method of claim 47, wherein the optical lens surface has a spherical structure.

49. The method of claim 47, wherein the optical lens surface has a non-spherical structure.

50. The method of claim 45, further comprising forming a buffer elastic film on a bottom of the light-transmitting substrate before providing the actuator.

51. The method of claim 45, wherein the providing the light-transmitting elastic film comprises:

forming the light-transmitting elastic film on a release sheet;

bonding the light-transmitting elastic film formed on the release sheet to the cover substrate; and detaching the release sheet from the light-transmitting elastic film.

52. The method of claim 45, wherein the step of providing the actuator includes:
   forming the actuator on a release sheet;
   bonding the actuator formed on the release sheet to the light-transmitting substrate; and
   detaching the release sheet from the actuator.

53. The method of claim 45, wherein the light-transmitting substrate and the cover substrate are formed of the same material.

54. The method of claim 45, wherein the light-transmitting substrate and the cover substrate are formed of different materials.

55. The method of claim 45, wherein at least one of the lower lens surface and the upper lens surface has a spherical structure.

56. The method of claim 45, wherein at least one of the lower lens surface and the upper lens surface has a non-spherical structure.

57. The method of claim 45, wherein the actuator comprises a polymer actuator which is formed of any one of an electrostrictive polymer, a dielectric elastomer, and an ionic polymer.

58. The method of claim 45, wherein the light-transmitting elastic film is formed of polydimethylsiloxane (PDMS).

* * * * *